United States Patent
Flores et al.

(10) Patent No.: US 10,370,490 B2
(45) Date of Patent: Aug. 6, 2019

(54) POLYCARBONATE FIBERS AND SUBSTRATES COMPRISING SAME

(71) Applicant: SABIC Global Technologies B.V., Bergen op Zoom (NL)

(72) Inventors: Amanda Marie Flores, Pittsfield, MA (US); Jacob LaBelle, Pittsfield, MA (US); Peter James Zuber, Pittsfield, MA (US); Kim R. Choate, Pittsfield, MA (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 8 days.

(21) Appl. No.: 15/301,248

(22) PCT Filed: Apr. 3, 2015

(86) PCT No.: PCT/US2015/024241
§ 371 (c)(1),
(2) Date: Sep. 30, 2016

(87) PCT Pub. No.: WO2015/153966
PCT Pub. Date: Oct. 8, 2015

(65) Prior Publication Data
US 2017/0015783 A1 Jan. 19, 2017

Related U.S. Application Data

(60) Provisional application No. 62/014,857, filed on Jun. 20, 2014, provisional application No. 61/975,429, filed on Apr. 4, 2014.

(51) Int. Cl.
| | |
|---|---|
| *C08G 64/14* | (2006.01) |
| *D21H 13/20* | (2006.01) |
| *D01F 6/64* | (2006.01) |
| *D01D 10/00* | (2006.01) |
| *C08J 3/24* | (2006.01) |
| *C08J 3/28* | (2006.01) |
| *C08L 69/00* | (2006.01) |
| *C09D 169/00* | (2006.01) |
| *D01D 5/06* | (2006.01) |
| *D01D 5/04* | (2006.01) |
| *D01D 5/18* | (2006.01) |

(52) U.S. Cl.
CPC ............. *C08G 64/14* (2013.01); *C08J 3/24* (2013.01); *C08J 3/28* (2013.01); *C08L 69/00* (2013.01); *C09D 169/00* (2013.01); *D01D 5/06* (2013.01); *D01D 10/00* (2013.01); *D01F 6/64* (2013.01); *D21H 13/20* (2013.01); *C08J 2369/00* (2013.01); *C08L 2201/02* (2013.01); *C08L 2201/08* (2013.01); *C08L 2203/12* (2013.01); *C08L 2205/16* (2013.01); *C08L 2312/06* (2013.01); *D01D 5/04* (2013.01); *D01D 5/18* (2013.01); *D10B 2505/02* (2013.01); *D10B 2505/04* (2013.01)

(58) Field of Classification Search
CPC .............. D21H 13/20; D21H 5/0002; Y10T 428/2931; Y10T 428/31507; C08L 69/00; C08L 2201/02; C08L 2201/08; C08L 2203/12; C08L 2205/16; C08L 2312/06; C08L 69/005; C08J 2369/00; C08J 3/28; C08J 3/24; C08G 64/14; D01D 10/00; D01D 5/04; D01D 5/06; D01D 5/08; D01F 6/06; D04H 1/541; H01B 3/48; H01B 3/52
See application file for complete search history.

(56) References Cited

U.S. PATENT DOCUMENTS

| | | | | |
|---|---|---|---|---|
| 3,996,404 A * | 12/1976 | Matsumoto | .............. | D01F 8/06 156/181 |
| 4,333,809 A * | 6/1982 | Schreckenberg | ...... | C08G 64/18 522/163 |
| 4,919,514 A * | 4/1990 | Ebert | .................... | C08F 290/06 385/141 |
| 5,034,496 A | 7/1991 | Bales et al. | | |
| 6,613,820 B2 * | 9/2003 | Fujiguchi | .............. | C08K 5/521 524/109 |
| 7,649,040 B2 * | 1/2010 | Choate, Jr. | .............. | C08K 3/30 524/165 |

(Continued)

FOREIGN PATENT DOCUMENTS

| | | | | |
|---|---|---|---|---|
| EP | 1493776 A2 * | 1/2005 | ............. | C08K 5/521 |
| GB | 1109685 A * | 4/1968 | ............... | C08K 5/06 |

(Continued)

OTHER PUBLICATIONS

International Preliminary Report on Patentability for International Application No. PCT/US2015/024241 dated Oct. 13, 2016.

(Continued)

*Primary Examiner* — Jose A Fortuna
(74) *Attorney, Agent, or Firm* — Cantor Colburn LLP

(57) ABSTRACT

Disclosed herein are polycarbonate fibers and fibrous substrates, such as papers, containing such fibers. The polycarbonate fibers are produced from a polymeric composition comprising a cross-linkable polycarbonate containing endgroups derived from a monofunctional benzophenone or containing repeating units derived from a difunctional benzophenone. The polycarbonate fibers can be combined with other fibers to form the fibrous substrate. Upon exposure to ultraviolet light, crosslinking of the polycarbonate fibers will occur, improving various properties of the fibrous substrate.

20 Claims, 5 Drawing Sheets

(56) References Cited

U.S. PATENT DOCUMENTS

| | | | | |
|---|---|---|---|---|
| 10,017,622 B2* | 7/2018 | Flores | ................. | C08K 5/0041 |
| 10,066,056 B2* | 9/2018 | Flores | ................. | C08K 5/0066 |
| 10,131,742 B2* | 11/2018 | Lyakhovych | .......... | C08G 64/14 |
| 2002/0165300 A1* | 11/2002 | Fujiguchi | ............... | C08K 5/521 |
| | | | | 524/141 |
| 2004/0030090 A1* | 2/2004 | Meyer | .................... | C07C 45/46 |
| | | | | 528/370 |
| 2011/0178225 A1* | 7/2011 | Kudo | ................... | C08F 283/12 |
| | | | | 524/507 |
| 2013/0260088 A1* | 10/2013 | David | ..................... | B32B 3/12 |
| | | | | 428/116 |
| 2014/0093712 A1* | 4/2014 | Tong | ....................... | C08L 69/00 |
| | | | | 428/220 |
| 2014/0178661 A1* | 6/2014 | Adjei | .................... | D21H 17/72 |
| | | | | 428/220 |
| 2014/0178665 A1 | 6/2014 | Morizur et al. | | |
| 2014/0275321 A1 | 9/2014 | Morizur et al. | | |
| 2014/0275322 A1 | 9/2014 | Morizur et al. | | |
| 2015/0025180 A1* | 1/2015 | Monden | .................. | C08K 7/06 |
| | | | | 524/116 |
| 2017/0015783 A1* | 1/2017 | Flores | .................... | D01D 10/00 |
| 2017/0129996 A1* | 5/2017 | Flores | ................. | C08K 5/0066 |
| 2017/0129997 A1* | 5/2017 | Lyakhovych | .......... | C08G 64/14 |
| 2017/0166708 A1* | 6/2017 | Flores | ........................ | C08J 3/24 |
| 2017/0166742 A1* | 6/2017 | Hoover | .................... | C08L 69/00 |
| 2017/0198113 A1* | 7/2017 | Flores | ................. | C08K 3/0033 |
| 2017/0247507 A1* | 8/2017 | Hoover | .................. | C08G 64/14 |
| 2017/0321014 A1* | 11/2017 | Lee | ........................ | C08G 64/24 |

FOREIGN PATENT DOCUMENTS

| | | |
|---|---|---|
| JP | 2012 072526 A | 4/2012 |
| JP | 2012/072526 A | 4/2012 |
| WO | WO 2009/002869 A2 | 12/2008 |
| WO | WO-2015153966 A1 * 10/2015 | ............. D01D 10/00 |

OTHER PUBLICATIONS

International Search Report and Written Opinion dated May 29, 2015 in PCT/US2015/024241.

* cited by examiner

POLYCARBONATE FIBERS AND SUBSTRATES COMPRISING SAME

CROSS REFERENCE TO RELATED APPLICATIONS

The subject application is a 371 of PCT/US2015/024241, filed Apr. 3, 2015, which claims priority to U.S. Provisional Patent Application Ser. No. 61/975,429, filed Apr. 4, 2014, and also to U.S. Provisional Patent Application Ser. No. 62/014,857, filed Jun. 20, 2014.

BACKGROUND

The present disclosure relates to polycarbonate fibers formed from a cross-linkable polycarbonate resins containing a photoactive group derived from a benzophenone, and fibrous substrates containing such fibers. The polycarbonate fibers can be crosslinked, improving the properties of the fibrous substrate.

Polycarbonates (PC) are thermoplastic resins with desirable properties such as high impact strength and toughness, transparency, and heat resistance. However, they also drip when exposed to a flame, and this behavior worsens as wall thickness decreases.

Fibers have very small diameters (i.e. thickness), are frequently exposed to various chemicals during use, and should be resistant to degradation. A common concern with fibers is their dimensional stability. It would be desirable to produce fibers and substrates with good dimensional stability, chemical resistance, and flame retardance.

BRIEF DESCRIPTION

The present disclosure relates to polycarbonate fibers which are produced from a cross-linkable polycarbonate, and processes for preparing these fibers. Upon exposure to ultraviolet radiation, the fibers crosslink, increasing chemical resistance.

Depending on the timing of the crosslinking, the fibers can also be chemically incorporated with other resins of the article in which they are used. Such articles may include fibrous substrates, where the polycarbonate fibers can be used as reinforcing fibers, for example in papermaking. The crosslinking can be performed after calendaring or melting of the polycarbonate fibers into a matrix.

These and other non-limiting characteristics are further described below.

BRIEF DESCRIPTION OF THE DRAWINGS

The following drawings are presented to illustrate the exemplary embodiments disclosed herein and not to limit them.

DETAILED DESCRIPTION

Figure 1:
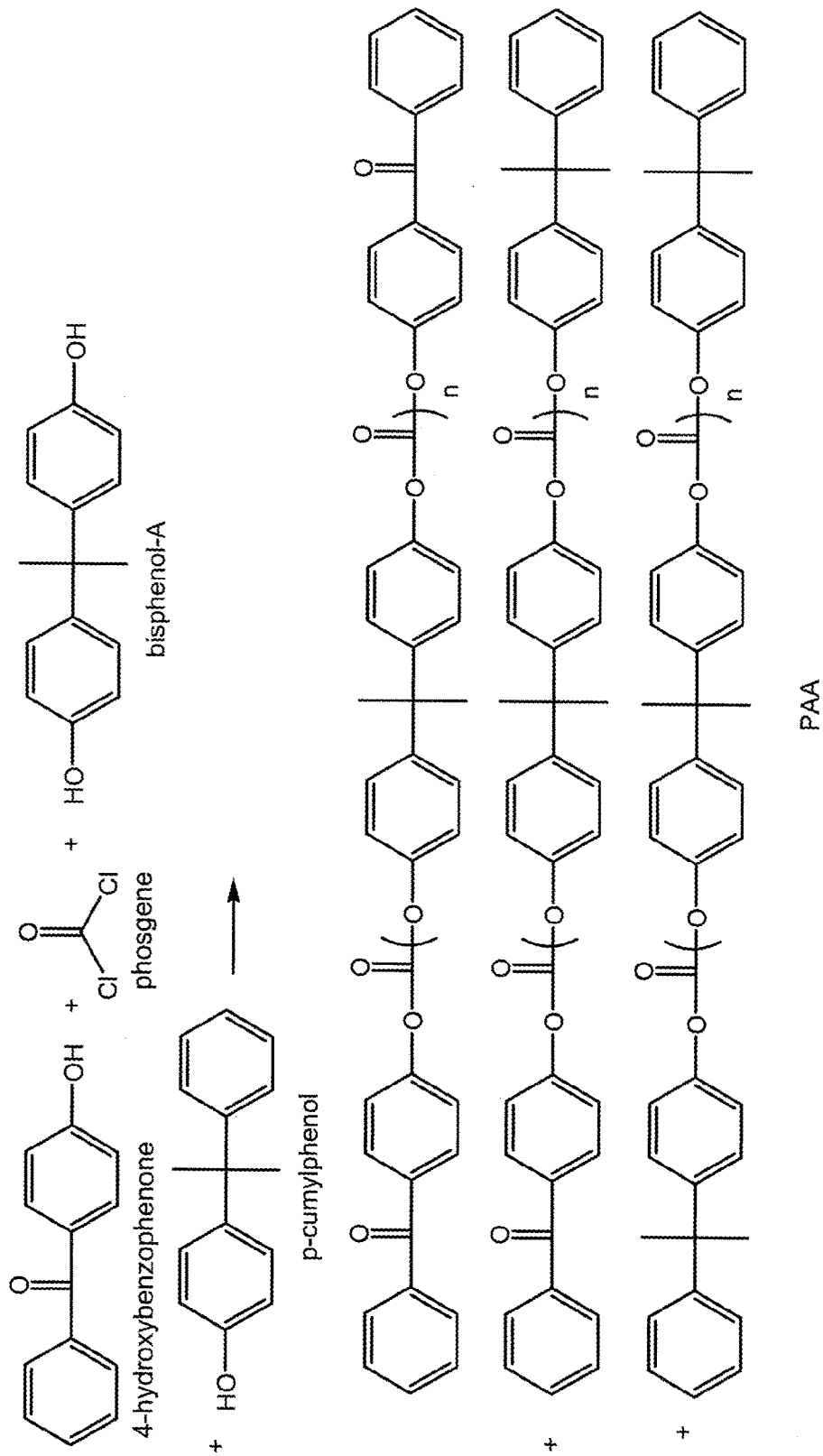
FIG. 1 illustrates the formation of a photoactive additive (oligomer/polymer) from a monofunctional photoactive moiety, a first linker moiety, a diol chain extender, and a second endcapping agent.

In the following specification, the examples, and the claims which follow, reference will be made to some terms which are defined as follows.

Unless otherwise defined, all technical and scientific terms used herein have the same meaning as commonly understood by one of ordinary skill in the art. In case of conflict, the present document, including definitions, will control. All publications, patent applications, patents and other references mentioned herein are incorporated by reference in their entirety.

The singular forms "a," "an," and "the" include plural referents unless the context clearly dictates otherwise.

As used in the specification and in the claims, the open-ended transitional phrases "comprise(s)," "include(s)," "having," "contain(s)," and variants thereof require the presence of the named ingredients/steps and permit the presence of other ingredients/steps. These phrases should also be construed as disclosing the closed-ended phrases "consist of" or "consist essentially of" that permit only the named ingredients/steps and unavoidable impurities, and exclude other ingredients/steps.

Numerical values used herein should be understood to include numerical values which are the same when reduced to the same number of significant figures and numerical values which differ from the stated value by less than the experimental error of the measurement technique described for determining the value.

All ranges disclosed herein are inclusive of the recited endpoint and independently combinable (for example, the range of "from 2 grams to 10 grams" is inclusive of the endpoints, 2 grams and 10 grams, and all the intermediate values).

The term "about" can be used to include any numerical value that can carry without changing the basic function of that value. When used with a range, "about" also discloses the range defined by the absolute values of the two endpoints, e.g., "about 2 to about 4" also discloses the range "from 2 to 4." The term "about" may refer to plus or minus 10% of the indicated number.

Compounds are described using standard nomenclature. Any position not substituted by an indicated group is understood to have its valency filled by a bond or a hydrogen atom. A dash ("-") that is not between two letters indicates a point of attachment for a substituent, e.g. —CHO attaches through the carbon atom.

The term "aliphatic" refers to an array of atoms that is not aromatic. The backbone of an aliphatic group is composed exclusively of carbon. An aliphatic group is substituted or unsubstituted. Exemplary aliphatic groups are ethyl and isopropyl.

An "aromatic" radical has a ring system containing a delocalized conjugated pi system with a number of pi-electrons that obeys Hückel's Rule. The ring system may include heteroatoms (e.g. N, S, Se, Si, O), or may be composed exclusively of carbon and hydrogen. Aromatic groups are not substituted. Exemplary aromatic groups include phenyl, thienyl, naphthyl, and biphenyl.

An "ester" radical has the formula —CO—O—, with the carbon atom and the oxygen atom both bonded to carbon atoms. A "carbonate" radical has the formula —O—CO—O—, with the oxygen atoms both bonded to carbon atoms.

Note that a carbonate group is not an ester group, and an ester group is not a carbonate group.

A "hydroxyl" radical has the formula —OH, with the oxygen atom bonded to a carbon atom. A "carboxy" or "carboxyl" radical has the formula —COOH, with the carbon atom bonded to another carbon atom. A carboxyl group can be considered as having a hydroxyl group. However, please note that a carboxyl group participates in certain reactions differently from a hydroxyl group. An "anhydride" radical has the formula —CO—O—CO—, with the carbonyl carbon atoms bonded to other carbon atoms.

This radical can be considered equivalent to two carboxyl groups. The term "acid halide" refers to a radical of the formula —CO—X, with the carbon atom bonded to another carbon atom.

The term "alkyl" refers to a fully saturated radical composed entirely of carbon atoms and hydrogen atoms. The alkyl radical may be linear, branched, or cyclic. The term "aryl" refers to an aromatic radical composed exclusively of carbon and hydrogen. Exemplary aryl groups include phenyl, naphthyl, and biphenyl. The term "hydrocarbon" refers to a radical which is composed exclusively of carbon and hydrogen. Both alkyl and aryl groups are considered hydrocarbon groups. The term "heteroaryl" refers to an aromatic radical containing at least one heteroatom. Note that "heteroaryl" is a subset of aromatic, and is exclusive of "aryl". The term "$C_3$-$C_6$ cycloalkyl" refers to cyclopropyl, cyclobutyl, cyclopentyl or cyclohexyl.

The term "halogen" refers to fluorine, chlorine, bromine, and iodine. The term "halo" means that the substituent to which the prefix is attached is substituted with one or more independently selected halogen radicals.

The term "alkoxy" refers to an alkyl radical which is attached to an oxygen atom, i.e. —O—$C_nH_{2n+1}$. The term "aryloxy" refers to an aryl radical which is attached to an oxygen atom, e.g. —O—$C_6H_5$.

An "alkenyl" radical is composed entirely of carbon atoms and hydrogen atoms and contains a carbon-carbon double bond that is not part of an aromatic structure. An exemplary alkenyl radical is vinyl (—CH=$CH_2$).

The term "alkenyloxy" refers to an alkenyl radical which is attached to an oxygen atom, e.g. —O—CH=$CH_2$. The term "arylalkyl" refers to an aryl radical which is attached to an alkyl radical that connects to the parent molecular moiety, e.g. benzyl (—$CH_2$—$C_6H_5$). The term "alkylaryl" refers to an alkyl radical which is attached to an aryl radical that connects to the parent molecular moiety, e.g. tolyl (—$C_6H_4$—$CH_3$).

The term "amino" refers to a radical of the formula R—$NH_2$, wherein R is a carbon atom. The term "ureido" refers to a radical of the formula —NH—CO—NH—, wherein the nitrogen atoms are both bonded to carbon atoms. The term "carbamate" refers to a radical of the formula —NH—CO—O—, wherein the nitrogen atom and the oxygen atom are both bonded to carbon atoms. The term "amide" refers to a radical of the formula —CO—NH—, wherein the nitrogen atom and the carbon atom are both bonded to carbon atoms.

The term "substituted" refers to at least one hydrogen atom on the named radical being substituted with another functional group, such as halogen, —CN, or —$NO_2$. However, the functional group is not hydroxyl, carboxyl, ester, acid halide, or anhydride. Besides the aforementioned functional groups, an aryl group may also be substituted with alkyl or alkoxy. An exemplary substituted aryl group is methylphenyl.

The term "copolymer" refers to a molecule having two or more different types of repeating units. A homopolymer has only one type of repeating unit.

The terms "Glass Transition Temperature" or "Tg" refer to the maximum temperature that a polycarbonate will retain at least one useful property such as impact resistance, stiffness, strength, or shape retention. The Tg can be determined by differential scanning calorimetry.

The term "haze" refers to the percentage of transmitted light, which in passing through a specimen deviates from the incident beam by forward scattering. Percent (%) haze may be measured according to ASTM D 1003-07.

The term "Melt Volume Rate" (MVR) or "Melt Flow Rate (MFR)" refers to the flow rate of a polymer in a melt phase as determined using the method of ASTM D1238-10. MVR is expressed in cubic centimeter per 10 minutes (cc/10 min or $cm^3$/10 min), and MFR is expressed in grams per 10 minutes.

The term "percent light transmission" or "% T" refers to the ratio of transmitted light to incident light, and may be measured according to ASTM D 1003-07.

"Polycarbonate" as used herein refers to an oligomer or a polymer comprising residues of one or more monomers, joined by carbonate linkages.

The term "crosslink" and its variants refer to the formation of a stable covalent bond between two polymers/oligomers. This term is intended to encompass the formation of covalent bonds that result in network formation, or the formation of covalent bonds that result in chain extension. The term "cross-linkable" refers to the ability of a polymer/oligomer to form such stable covalent bonds.

The present disclosure refers to "polymers," "oligomers", and "compounds". A polymer is a large molecule composed of multiple repeating units chained together. Different molecules of a polymer will have different lengths, and so a polymer has a molecular weight that is based on the average value of the molecules (e.g. weight average or number average molecular weight). An "oligomer" has only a few repeating units, while a "polymer" has many repeating units. In this disclosure, "oligomer" refers to molecules having a weight average molecular weight (Mw) of less than 15,000, and the term "polymer" refers to molecules having an Mw of 15,000 or more, as measured by GPC using polycarbonate molecular weight standards, measured prior to any UV exposure. In a compound, all molecules have the same molecular weight.

The terms "UVA", "UVB", "UVC", and "UVV" as used herein were defined by the wavelengths of light measured with the radiometer (EIT PowerPuck) used in these studies, as defined by the manufacturer (EIT Inc., Sterling, Va.). "UV" radiation refers to wavelengths of 200 nanometers (nm) to 450 nm. UVA refers to the range from 320-390 nm, UVB to the range from 280-320 nm, UVC to the range from 250-260 nm, and UVV to the range from 395-445 nm.

The present disclosure relates to polycarbonate fibers which are made from polymeric compositions containing a photoactive additive. The photoactive additive is a cross-linkable polycarbonate having a photoactive group derived from a benzophenone. When exposed to the appropriate UV wavelength, the resulting fiber will be substantially cross-linked. The resulting fiber will have improved chemical resistance and dimensional stability, and potentially anti-drip and flame retardant properties.

The cross-linkable polycarbonate resins contain photoactive ketone groups. The term "photoactive" refers to a moiety that, when exposed to ultraviolet light of the appropriate wavelength, crosslinks with another molecule. For example, the bisphenol-A monomer in a bisphenol-A homopolycarbonate is not considered to be photoactive, even though photo-Fries rearrangement can occur, because the atoms do not crosslink, but merely rearrange in the polymer backbone. A "ketone group" is a carbonyl group (—CO—) that is bonded to two other carbon atoms (i.e. —R—CO—R'—). An ester group and a carboxylic acid group are not a ketone group because their carbonyl group is bonded to an oxygen atom.

The cross-linkable polycarbonate is formed from a reaction mixture containing at least a benzophenone, a chain extender, and a first linker moiety. The benzophenone has either one or two functional groups, and provides a photoactive ketone group for crosslinking. The first linker moiety has a plurality of linking groups that can react with the functional group(s) of the benzophenone. An end-capping agent and/or additional extenders can also be included, which are not photoactive.

The functional group of the benzophenone can be a hydroxyl group, or a carboxyl group or equivalent thereof. In this regard, carboxyl, ester, acid halide, and anhydrides react in the same way, and are thus considered to be equivalent to each other. For clarity, these four groups are illustrated below:

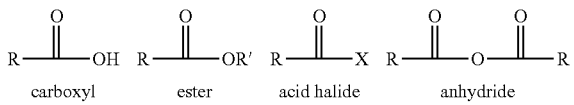

wherein R is the remainder of the benzophenone, R' is alkyl or aryl, and X is a halogen.

The linking groups of the linker moiety react with the functional group of the benzophenone, and are generally also a hydroxyl group, or a carboxyl group or equivalent thereof. In this regard, a hydroxyl group will react with a carboxyl group or its equivalents. A carboxyl group or equivalent will react with a hydroxyl group, but will not react with another carboxyl (because the anhydride is formed).

In some embodiments, the benzophenone is a monohydroxybenzophenone, and has the structure of Formula (I):

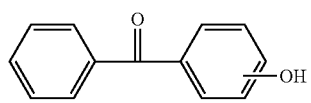

Formula (I)

In more specific embodiments, the monohydroxybenzophenone is 4-hydroxybenzophenone (4-HBP).

In other embodiments, the benzophenone is a dihydroxybenzophenone, and has the structure of Formula (II):

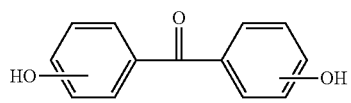

Formula (II)

The two hydroxyl groups can be located in any combination of locations, e.g. 4,4'-; 2,2'-; 2,4'-; etc. In more specific embodiments, the dihydroxybenzophenone is 4,4'-dihydroxybenzophenone (4,4'-DHBP).

The photoactive benzophenone is reacted with one or more first linker moieties. At least one first linker moiety comprises a plurality of linking groups that can react with the functional group(s) of the benzophenone. The linking groups can be joined to an aliphatic group or an aromatic group which serves as a "backbone" for the linker moiety. In particular embodiments, the linker moiety can have two, three, four, or even more linking groups. Thus, the first linker moiety can act as a branching agent.

Some exemplary linker moieties which have two linking groups and can react with the benzophenone include those with the structure of one of Formulas (1)-(4):

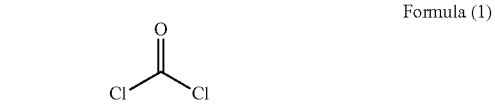

Formula (1)

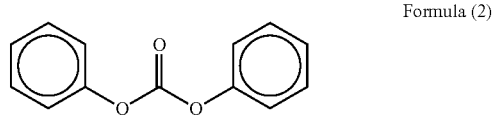

Formula (2)

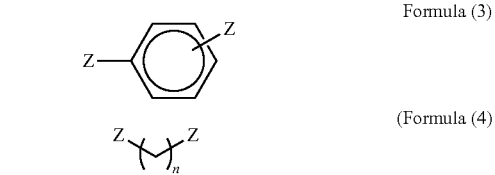

Formula (3)

(Formula (4))

wherein Z is hydroxyl or —COY, where Y is hydroxyl, halogen, alkoxy, or aryloxy; and where n is 1 to 20. Formula (3) encompasses isophthalic acid and terephthalic acid. The notation of Formula (4) indicates that the aliphatic backbone has any conformation and the Z groups may be attached to any carbon atom. Formula (4) encompasses adipic acid, sebacic acid, and dodecanedioic acid.

Some examples of linker moieties which have three linking groups and can react with the benzophenone include those with the structure of one of Formulas (5-(7):

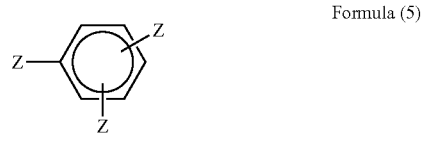

Formula (5)

Formula (6)

Formula (7)

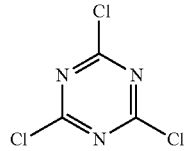

wherein Z is hydroxyl or —COY, where Y is hydroxyl, halogen, alkoxy, or aryloxy. The notation of Formula (6) indicates that the aliphatic backbone has any conformation and the Z groups may be attached to any carbon atom.

Some exemplary linker moieties which have four linking groups and can react with the benzophenone include those with the structure of one of Formulas (8)-(11):

Formula (8)

Formula (9)

Formula (10)

Formula (11)

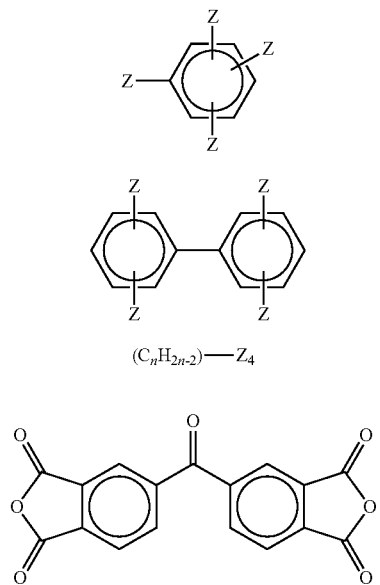

wherein Z is hydroxyl or —COY, wherein Y is hydroxyl, alkoxy, aryloxy, or halogen; and where n is 1 to 20. The notation of Formula (11) indicates that the aliphatic backbone has any conformation and the Z groups may be attached to any carbon atom.

In some embodiments, linking groups can be provided by short oligomers, including oligomers containing glycidyl methacrylate monomers with styrene or methacrylate monomers, or epoxidized novolac resins. These oligomers can permit the desired the number of functional groups to be provided.

In particularly desired embodiments, the photoactive additive can be formed from a reaction mixture containing the photoactive benzophenone, the first linker moiety, and one or more chain extenders. The chain extender contains only two functional groups and is not photoactive when exposed to light. The chain extender can be used to provide a desired level of miscibility when the additive is mixed with the polymer. The photoactive additive may comprise from about 75 mole % to about 99.5 mole %, or from 95 mole % to about 99 mole %, or from about 80 mole % to about 95 mole %, or from about 80 mole % to about 90 mole %, of the chain extender.

A first exemplary chain extender is a bisphenol of Formula (A):

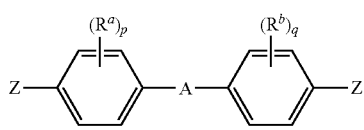

(A)

wherein Z is hydroxyl or —COY, wherein Y is hydroxyl, alkoxy, aryloxy, or halogen; $R^a$ and $R^b$ each represent a halogen atom or a monovalent hydrocarbon group and may be the same or different; p and q are each independently integers of 0 to 4; and A represents one of the groups of formula (A-1):

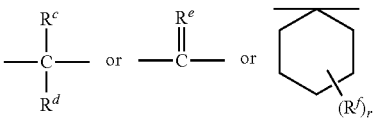

(A-1)

wherein $R^c$ and $R^d$ each independently represent a hydrogen atom or a monovalent linear or cyclic hydrocarbon group; $R^e$ is a divalent hydrocarbon group; $R^f$ is a monovalent linear hydrocarbon group; and r is an integer from 0 to 5. For example, A can be a substituted or unsubstituted $C_3$-$C_{18}$ cycloalkylidene.

Specific examples of the types of bisphenol compounds that may be represented by Formula (A) include 2,2-bis(4-hydroxyphenyl) propane ("bisphenol-A" or "BPA"), 4,4'-(1-phenylethane-1,1-diyl)diphenol or 1,1-bis(4-hydroxyphenyl)-1-phenyl-ethane (bisphenol-AP); 1,1-bis(4-hydroxyphenyl)-3,3,5-trimethylcyclohexane (bisphenol TMC); 1,1-bis(4-hydroxy-3-methylphenyl) cyclohexane (DMBPC); and 2,2-bis(3,5-dibromo-4-hydroxyphenyl) propane (tetrabromobisphenol-A or TBBPA).

A second exemplary chain extender is a bisphenol of Formula (B):

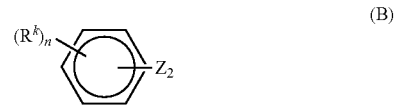

(B)

wherein Z is hydroxyl or —COY, wherein Y is hydroxyl, alkoxy, aryloxy, or halogen; each $R^k$ is independently a $C_{1-10}$ hydrocarbon group, and n is 0 to 4. The halogen is usually bromine. Examples of compounds that may be represented by Formula (B) include resorcinol, 5-methyl resorcinol, 5-phenyl resorcinol, catechol; hydroquinone; and substituted hydroquinones such as 2-methyl hydroquinone.

A third exemplary chain extender is a bisphenolpolydiorganosiloxane of Formula (C-1) or (C-2):

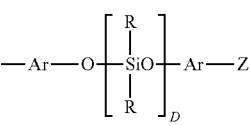

(C-1)

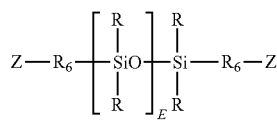

(C-2)

wherein Z is hydroxyl or —COY, wherein Y is hydroxyl, alkoxy, aryloxy, or halogen; each Ar is independently aryl; each R is independently alkyl, alkoxy, alkenyl, alkenyloxy, aryl, aryloxy, arylalkyl, or alkylaryl; each $R_6$ is independently a divalent $C_1$-$C_{30}$ organic group such as a $C_1$-$C_{30}$ alkyl, $C_1$-$C_{30}$ aryl, or $C_1$-$C_{30}$ alkylaryl; and D and E are an average value of 2 to about 1000, specifically about 2 to about 500, or from about 10 to about 200, or more specifically about 10 to about 75.

Specific examples of Formulas (C-1) or (C-2) are illustrated below as Formulas (C-a) through (C-d):

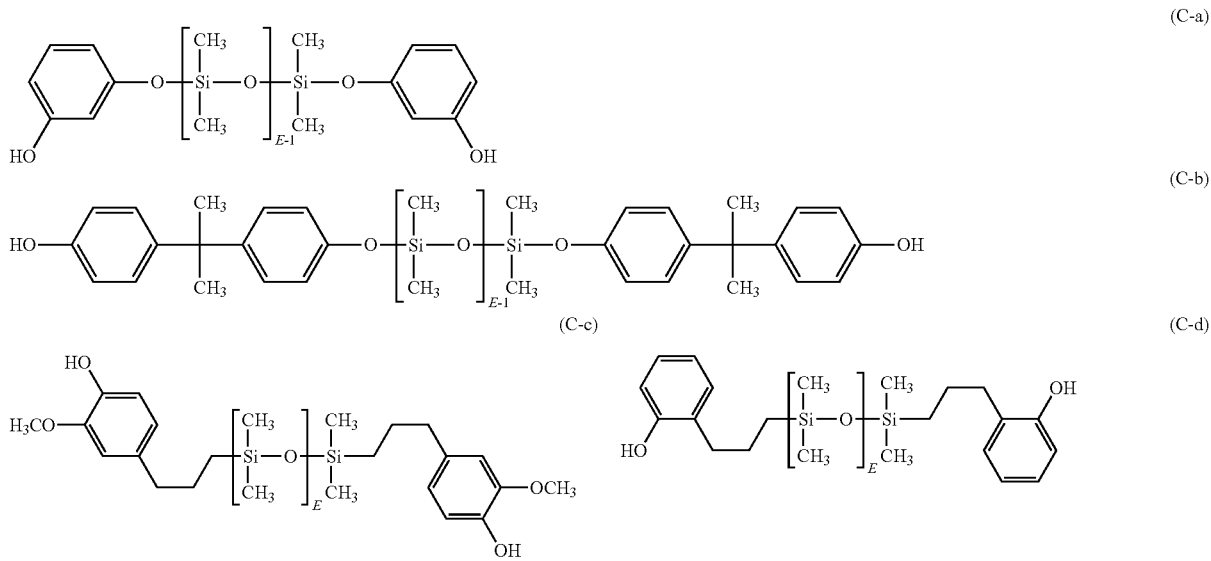

where E is an average value from 10 to 200.

A fourth exemplary chain extender is an aliphatic compound of Formula (D):

$$Z-\underset{\underset{X}{|}}{\overset{\overset{X}{|}}{C}}{}_{j}-Z \quad (D)$$

wherein Z is hydroxyl or —COY, wherein Y is hydroxyl, alkoxy, aryloxy, or halogen; each X is independently hydrogen, halogen, or alkyl; and j is an integer from 1 to 20. Examples of an aliphatic compound include ethylene glycol, propanediol, 2,2-dimethyl-propanediol, 1,6-hexanediol, and 1,12-dodecanediol.

A fifth exemplary chain extender is a dihydroxy compound of Formula (E), which may be useful for high heat applications:

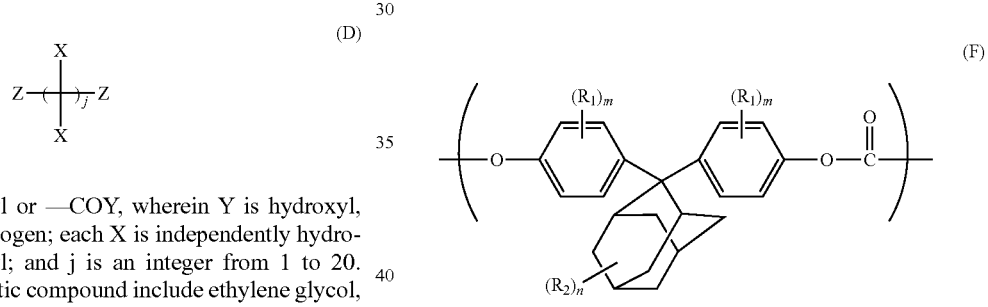

wherein $R^{13}$ and $R^{15}$ are each independently halogen or $C_1$-$C_6$ alkyl, $R^{14}$ is $C_1$-$C_6$ alkyl, or phenyl substituted with up to five halogens or $C_1$-$C_6$ alkyl groups, and c is 0 to 4. In specific embodiments, $R^{14}$ is a $C_1$-$C_6$ alkyl or phenyl group; or each c is 0. Compounds of Formula (E) include 3,3-bis(4-hydroxyphenyl)-2-phenylisoindolin-1-one (PPPBP).

Another chain extenders that might impart high Tgs to the polycarbonate has adamantane units. Such compounds may have repetitive units of the following formula (F) for high heat applications:

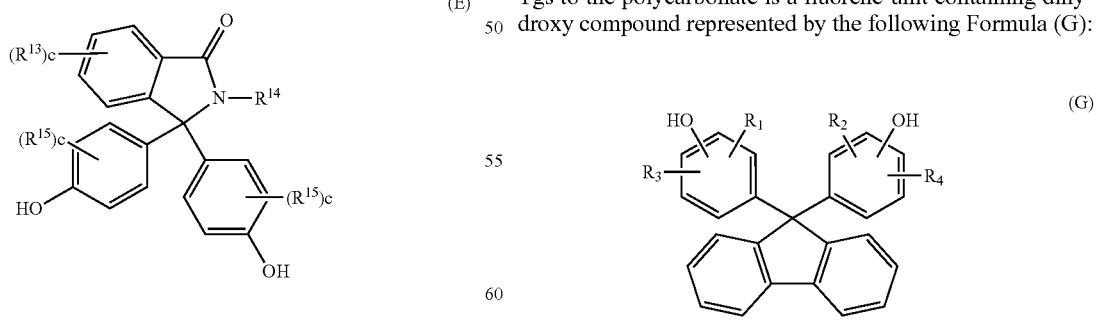

wherein $R_1$ is halogen, $C_1$-$C_6$ alkyl, $C_1$-$C_6$ alkoxy, $C_6$-$C_{12}$ aryl, $C_7$-$C_{13}$ aryl-substituted alkenyl, or $C_1$-$C_6$ fluoroalkyl; $R_2$ is halogen, $C_1$-$C_{12}$ alkyl, $C_1$-$C_{12}$ alkoxy, $C_6$-$C_{12}$ aryl, $C_7$-$C_{13}$ aryl-substituted alkenyl, or $C_1$-$C_{12}$ fluoroalkyl; m is an integer of 0 to 4; and n is an integer of 0 to 14.

Another dihydroxy compounds that might impart high Tgs to the polycarbonate is a fluorene-unit containing dihydroxy compound represented by the following Formula (G):

wherein $R_1$ to $R_4$ are each independently hydrogen, $C_1$-$C_9$ hydrocarbon, or halogen.

Another chain extender that could be used is an isosorbide. A monomer unit derived from isosorbide may be an isorbide-bisphenol unit of Formula (H):

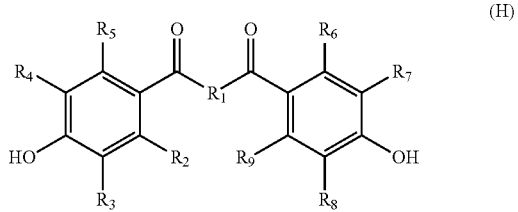

wherein $R_1$ is an isosorbide unit and $R_2$-$R_9$ are each independently a hydrogen, a halogen, a $C_1$-$C_6$ alkyl, a methoxy, an ethoxy, or an alkyl ester.

The $R_1$ isosorbide unit may be represented by Formula (H-a):

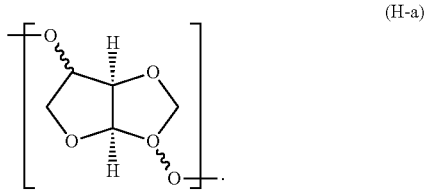

The isosorbide unit may be derived from one isosorbide, or be a mixture of isomers of isosorbide. The stereochemistry of Formula (I) is not particularly limited. These diols may be prepared by the dehydration of the corresponding hexitols. The isosorbide-bisphenol may have a pKa of between 8 and 11.

As previously explained, the photoactive benzophenone is reacted with a first linker moiety to obtain the photoactive additive. If desired, the reaction mixture can include branching agents that contain three, four, or even more functional groups. The functional groups can be, for example, hydroxyl groups or carboxylic acid groups. Generally speaking, these react in the same way as the chain extender. Branching agents with three hydroxyl groups include 1,1,1-trimethoxyethane; 1,1,1-trimethoxymethane; 1,1,1-tris (hydroxyphenyl) ethane (THPE), and 1,3,5-tris[2-(4-hydroxyphenyl)-propan-2-yl]benzene. Branching agents with four hydroxyl groups include pentaerythritol and 4-[2,6,6-tris(4-hydroxyphenyl)heptan-2-yl]phenol. In other embodiments, the branching agent can be an oligomer, made from epoxidized novolac monomer, that permit the desired number of functional groups to be provided.

Branching agents having three carboxylic acid groups include benzenetricarboxylic acid, citric acid, and cyanuric chloride. Branching agents having four carboxylic acid groups include benzenetetracarboxylic acid, biphenyl tetracarboxylic acid, and benzophenone tetracarboxylic dianhydride. The corresponding acyl halides and esters of such acids are also contemplated. Oligomers containing glycidyl methacrylate monomers with styrene or methacrylate monomers are also contemplated.

An end-capping agent is generally used to terminate any polymer chains of the photoactive additive. The end-capping agent (i.e. chain stopper) can be a monohydroxy compound, a mono-acid compound, or a mono-ester compound. Exemplary endcapping agents include phenol, p-cumylphenol (PCP), resorcinol monobenzoate, p-tert-butylphenol, octylphenol, p-cyanophenol, and p-methoxyphenol. Unless modified with other adjectives, the term "end-capping agent" is used herein to denote a compound that is not photoactive when exposed to light. For example, the end-capping agent does not contain a ketone group. The photoactive additive may comprise about 0.5 mole % to about 5.0 mole % endcap groups derived from this non-photoactive. It is noted that when the photoactive hydroxybenzophenone is a monohydroxybenzophenone, the monohydroxybenzophenone acts as an end-capping agent. In that situation, a second end-capping agent can also be used. The photoactive additive may comprise about 0.5 mole % to about 5.0 mole % endcap groups, including about 1 mole % to about 3 mole %, or from about 1.7 mole % to about 2.5 mole %, or from about 2 mole % to about 2.5 mole %, or from about 2.5 mole % to about 3.0 mole % endcap groups derived from each end-capping agent.

The photoactive additive may be a polyester-polycarbonate copolymer. The molar ratio of ester units to carbonate units in the polyester-polycarbonate may vary broadly, for example 1:99 to 99:1, specifically 10:90 to 90:10, more specifically 25:75 to 75:25, depending on the desired properties of the final composition. The polyester units may be derived from an aliphatic or aromatic dicarboxylic acid. The polyester unit may be derived from the reaction of a combination of isophthalic and terephthalic diacids (or derivatives thereof) with either resorcinol or bisphenol-A. In another specific embodiment, the polycarbonate units may be derived from resorcinol and bisphenol-A in a molar ratio of resorcinol carbonate units to bisphenol-A carbonate units of 1:99 to 99:1.

The photoactive additives (i.e. cross-linkable polycarbonate resin) of the present disclosure can be an oligomer or a polymer. The oligomer has a weight average molecular weight (Mw) of less than 15,000, including 10,000 or less. The polymer has a Mw of 15,000 or higher. In particular embodiments, the Mw is between 17,000 and 80,000 Daltons, or between 17,000 and 35,000 Daltons. The Mw may be varied as desired. Polymers/oligomers with relatively higher Mw's generally retain their mechanical properties better, while polymers/oligomers with relatively lower Mw's generally have better flow properties.

The resulting cross-linkable polycarbonate may be an oligomer or a polymer with a weight average molecular weight and a polydispersity index. The product resulting from the reaction in FIG. 1 is illustrative of such a polymer. Here, bisphenol-A (chain extender) is reacted with phosgene (first linker moiety), 4-hydroxybenzophenone (monofunctional photoactive moiety), and p-cumylphenol (second end-capping agent) to obtain the photoactive additive (PAA, i.e. cross-linkable polycarbonate resin). Some chains will have two 4-hydroxybenzophenone endcaps, some will have only one 4-hydroxybenzophenone endcap, and some will have none, distributed in a statistical fashion.

Figure 2:
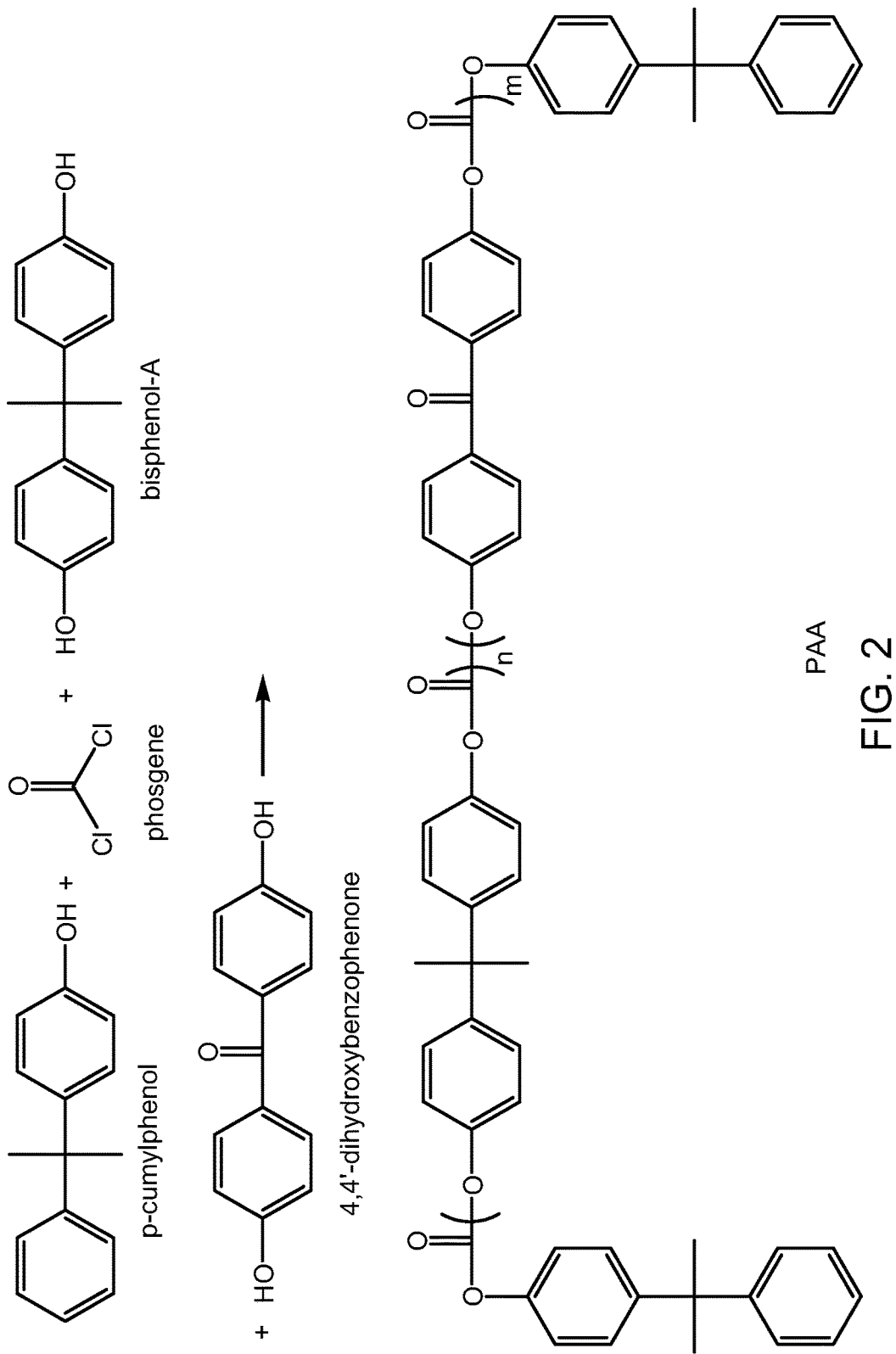
FIG. 2 illustrates the formation of a cross-linkable polycarbonate (oligomer/polymer) from a dihydroxybenzophenone, a first linker moiety (phosgene), a diol chain extender (bisphenol-A), and an end-capping agent (p-cumylphenol).

Another example of a cross-linkable polycarbonate is shown in FIG. 2. Here, 4,4'-dihydroxybenzophenone is reacted with phosgene (first linker moiety), bisphenol-A (chain extender), and p-cumylphenol (end-capping agent) to obtain the cross-linkable polycarbonate. A copolymer is thus formed with a weight average molecular weight and a polydispersity index, and containing carbonate linkages.

In particular embodiments, the cross-linkable polycarbonate comprises about 0.5 mol % to about 5 mol % endcap groups derived from a monohydroxybenzophenone, and has a polydispersity index (PDI) of between 3.0 and 7.3 as measured by GPC using a UV-VIS detector and polycarbonate standards. More specifically, the polycarbonate contains repeating units derived from bisphenol-A, and can be a homopolymer or a copolymer. In particular embodiments, the monohydroxybenzophenone is 4-hydroxybenzophenone.

In particular embodiments, the photoactive cross-linkable polycarbonate contains about 0.5 mol % of endcaps derived from a monohydroxybenzophenone, and has a weight-average molecular weight (Mw) from 17,000 to 30,000 Daltons. In other specific embodiments, the photoactive cross-linkable polycarbonate contains about 2.5 mol % of endcaps derived from a monohydroxybenzophenone, and has a weight-average molecular weight (Mw) from 24,000 to 31,000 Daltons. In still other definite embodiments, the photoactive cross-linkable polycarbonate has an MVR of 8 to 10 cc/10 min at 300° C./1.2 kg.

In further embodiments, the cross-linkable polycarbonate does not contain any soft block segments from aliphatic polyesters, aliphatic polyethers, aliphatic polythioethers, aliphatic polyacetals, aliphatic polycarbonates, C—C linked polymers, or polysiloxanes.

In particular embodiments, the cross-linkable polycarbonate having monohydroxybenzophenone endcaps does not contain any repeating units derived from a dihydroxybenzophenone, a trihydroxybenzophenone, or a tetrahydroxybenzophenone.

In particular embodiments, the cross-linkable polycarbonate further comprises about 0.5 mole % to about 5.0 mole % endcap groups derived from a second end-capping agent in addition to the monohydroxybenzophenone. The second end-capping agent can be selected from the group consisting of phenol, p-t-butylphenol, p-cumylphenol, and 4-cyanophenol.

The cross-linkable polycarbonate having monohydroxybenzophenone endcaps may have a weight average molecular weight of 15,000 to 30,000, as measured by GPC using a UV-VIS detector and polycarbonate standards. The cross-linkable polycarbonate having monohydroxybenzophenone endcaps may have a melt flow rate from 7 to 20 g/10 min measured at 300° C./1.2 kg/360 sec dwell.

In some embodiments, the photoactive additive is a cross-linkable polycarbonate comprising repeating units derived from a dihydroxybenzophenone monomer (i.e. of Formula (II)). The cross-linkable polycarbonate may comprise from about 0.5 mole % to about 50 mole % of repeating units derived from the dihydroxybenzophenone. In more particular embodiments, the cross-linkable polycarbonate comprises from about 1 mole % to about 3 mole %, or from about 1 mole % to about 5 mole %, or from about 1 mole % to about 6 mole %, or from about 5 mole % to about 20 mole %, or from about 10 mole % to about 20 mole %, or from about 0.5 mole % to about 25 mole % of repeating units derived from the dihydroxybenzophenone. In more specific embodiments, the photoactive cross-linkable polycarbonate is a copolymerformed from the dihydroxybenzophenone, a diol chain extender, phosgene, and one or more end-capping agents. Most desirably, the dihydroxybenzophenone is 4,4'-dihydroxybenzophenone. Usually, the diol chain extender is bisphenol-A. In particular embodiments, the cross-linkable polycarbonate is a copolymer consisting of repeating units derived from 4,4'-dihydroxybenzophenone and bisphenol-A, with endcaps that are not photoactive. The copolymer contains from about 0.5 mole % to 50 mole % of repeating units derived from the dihydroxybenzophenone, and from about 50 mole % to 99.5 mole % of repeating units derived from the bisphenol-A.

The cross-linkable polycarbonate formed from the dihydroxybenzophenone may have a weight average molecular weight of 15,000 to 30,000, as measured by GPC using a UV-VIS detector and polycarbonate standards. The endcap groups on this cross-linkable polycarbonate are not derived from a benzophenone.

In particular embodiments, the photoactive cross-linkable polycarbonate is formed from a dihydroxybenzophenone, a diol chain extender, phosgene, and one or more end-capping agents. Most desirably, the dihydroxybenzophenone is 4,4'-dihydroxybenzophenone. In preferred embodiments, the diol chain extender is bisphenol-A, and the end-capping agent is p-cumylphenol. The resulting photoactive additive (i.e. cross-linkable polycarbonate resin) comprises from about 0.5 mol % to 25 mole % repeating units derived from the dihydroxybenzophenone. In more particular embodiments, the photoactive additive comprises from about 1 wt % to about 5 mole %, or from about 5 wt % to about 20 wt %, or from about 10 wt % to about 20 wt %, of the dihydroxybenzophenone.

In particular embodiments, the cross-linkable polycarbonate is a copolymer consisting of repeating units derived from 4,4'-dihydroxybenzophenone and bisphenol-A, with endcaps that are not photoactive. The copolymer contains from about 0.5 mol % to 25 mole % repeating units derived from the dihydroxybenzophenone, and from about 75 mol % to 99.5 mole % repeating units derived from the bisphenol-A.

Figure 3:
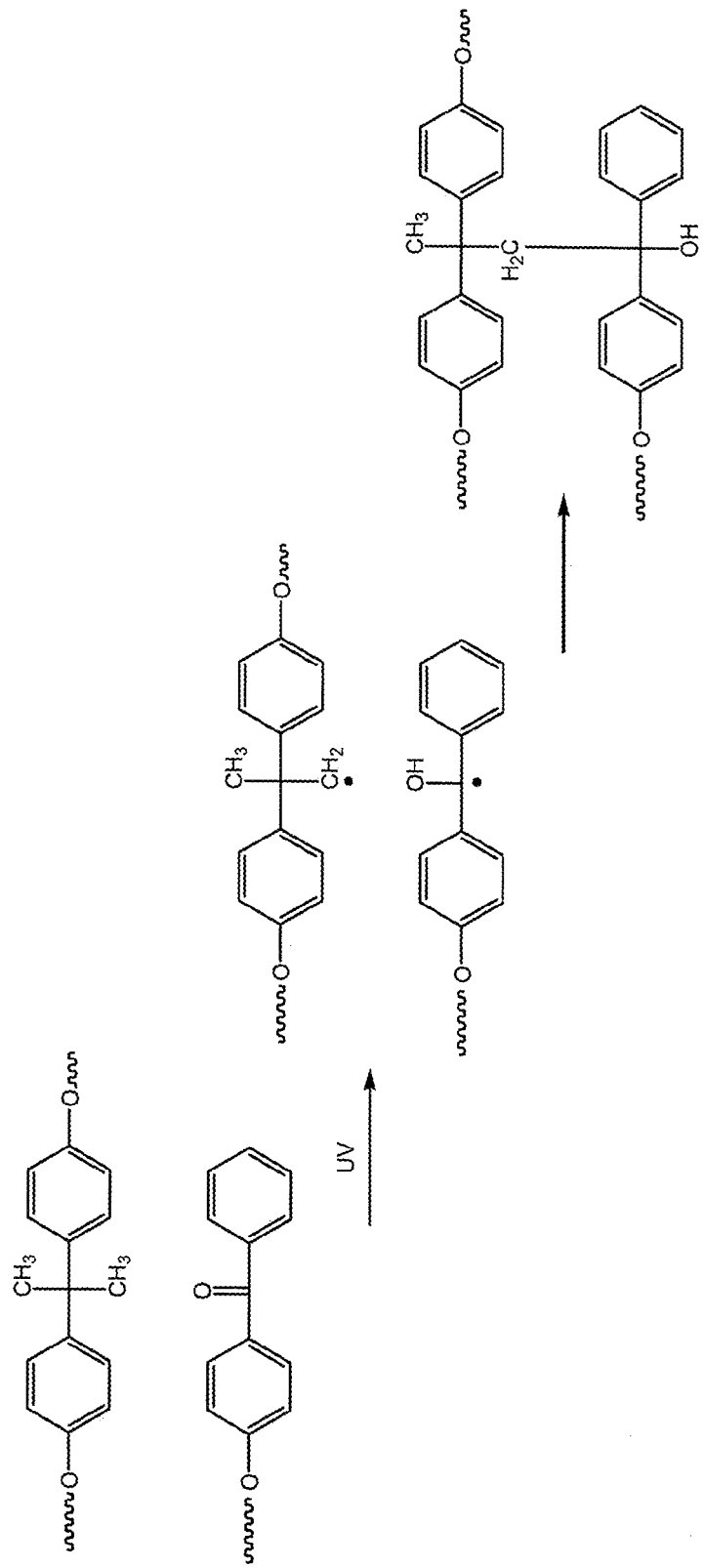
FIG. 3 illustrates the crosslinking mechanism of the photoactive additive.

The crosslinking mechanism is believed to be due to hydrogen abstraction by the ketone group from an alkyl group that acts as a hydrogen donor and subsequent coupling of the resulting radicals. This mechanism is illustrated in FIG. 3 with reference to a benzophenone (the photoactive moiety) and a bisphenol-A (BPA) monomer. Upon exposure to UV, the oxygen atom of the benzophenone abstracts a hydrogen atom from a methyl group on the BPA monomer and becomes a hydroxyl group. The methylene group then forms a covalent bond with the carbon of the ketone group.

The cross-linkable polycarbonates of the present disclosure may have a polydispersity index (PDI) of about 1.0 to about 10.0, about 2.0 to about 7.0, or about 3.0 to about 6.0, or about 3.0 to about 7.3, or about 2.4 to about 5.2. In other embodiments, the cross-linkable polycarbonates of the present disclosure may have a polydispersity index (PDI) of about 2.0 to about 5.0, about 2.0 to about 3.0, or about 2.0 to about 2.5. The PDI is measured prior to any UV exposure.

It is noted that the molecular weight (both weight-average and number-average) of the cross-linkable polycarbonate can be measured using two different kinds of detectors. Molecular weight determinations may be performed using gel permeation chromatography (GPC), using a cross-linked styrene-divinylbenzene column and calibrated to polycarbonate references using a UV-VIS detector set at 264 nm, or alternatively using a refractive index detector. Samples may be prepared at a concentration of about 1 mg/ml, and eluted at a flow rate of about 1.0 ml/min.

In embodiments, the ratio of the polydispersity index (PDI) measured using a UV detector to the PDI measured using an RI detector is 1.8 or less, when using a GPC method and polycarbonate molecular weight standards. The ratio may also be 1.5 or less, or 1.4 or less, or 1.2 or less, or 1.1 or less.

The cross-linkable polycarbonates in some embodiments may have a melt volume flow rate (often abbreviated MVR), which measures the rate of extrusion of a composition through an orifice at a prescribed temperature and load. In certain embodiments, the polycarbonates may have an MVR of 2 to 4 cubic centimeters per 10 minutes ($cm^3$/10 min), 2 to 12 $cm^3$/10 min, 2 to 70 $cm^3$/10 min, 2 to 50 $cm^3$/10 min, 2 to 40 $cm^3$/10 min, 2 to 30 $cm^3$/10 min, 2 to 25 $cm^3$/10 min, 2 to 20 $cm^3$/10 min, 5 to 70 $cm^3$/10 min, 5 to 50 $cm^3$/10 min, 5 to 40 cm³/10 min, 5 to 30 cm³/10 min, 5 to 25 cm³/10 min, 5 to 20 cm³/10 min, 8 to 10 cm³/10 min, 8 to 12 cm³/10 min, 10 to 170 cm³/10 min, 10 to 50 cm³/10 min, 10 to 40 cm³/10 min, 10 to 30 cm³/10 min, 10 to 25 cm³/10 min, or 10 to 20 cm³/10 min, using the ASTM D1238 method, 1.2 kg load, 300° C. temperature, 360 second dwell.

The cross-linkable polycarbonates of the present disclosure may have a melt flow rate (often abbreviated MFR), which measures the rate of extrusion of a composition through an orifice at a prescribed temperature and load. In certain embodiments, the polycarbonates may have an MFR of 1 to 40 grams/10 min, 6 to 15 grams/10 min, 6 to 8 grams/10 min, 6 to 12 grams/10 min, 2 to 30 grams/10 min, 5 to 30 grams/10 min, 8 to 12 grams/10 min, 8 to 10 grams/10 min, or 20 to 30 grams/10 min, using the ASTM D1238 method, 1.2 kg load, 300° C. temperature, 360 second dwell.

The cross-linkable polycarbonates of the present disclosure may have a glass transition temperature (Tg) of greater than 120° C., 125° C., 130° C., 135° C., 140° C., 145° C., 150° C., 155° C., 160° C., 165° C., 170° C., 175° C., 180° C., 185° C., 190° C., 200° C., 210° C., 220° C., 230° C., 240° C., 250° C., 260° C., 270° C., 280° C., 290° C., or 300° C., as measured using a differential scanning calorimetry method. In certain embodiments, the polycarbonates have glass transition temperatures ranging from about 120° C. to about 230° C., about 140° C. to about 160° C., about 145° C. to about 155° C., about 148° C. to about 152° C., or about 149° C. to about 151° C.

The cross-linkable polycarbonates of the present disclosure in certain embodiments may have a modulus of elasticity of greater than or equal to ($\geq$) 2200 megapascals (MPa), $\geq$2310 MPa, $\geq$2320 MPa, $\geq$2330 MPa, $\geq$2340 MPa, $\geq$2350 MPa, $\geq$2360 MPa, $\geq$2370 MPa, $\geq$2380 MPa, $\geq$2390 MPa, $\geq$2400 MPa, $\geq$2420 MPa, $\geq$2440 MPa, $\geq$2460 MPa, $\geq$2480 MPa, $\geq$2500 MPa, or $\geq$2520 MPa as measured by ASTM D 790 at 1.3 mm/min, 50 mm span.

In some embodiments, the cross-linkable polycarbonates of the present disclosure may have a flexural modulus of 2,200 to 2,500, preferably 2,250 to 2,450, more preferably 2,300 to 2,400 MPa. In other embodiments, the cross-linkable polycarbonates of the present disclosure may have a flexural modulus of 2,300 to 2,600, preferably 2,400 to 2,600, more preferably 2,450 to 2,550 MPa. The flexural modulus is also measured by ASTM D790.

The cross-linkable polycarbonates of the present disclosure in some embodiments may have a tensile strength at break of 260 megapascals (MPa), $\geq$61 MPa, $\geq$62 MPa, $\geq$63 MPa, $\geq$64 MPa, $\geq$65 MPa, $\geq$66 MPa, $\geq$67 MPa, $\geq$68 MPa, $\geq$69 MPa, $\geq$70 MPa, $\geq$71 MPa, $\geq$72 MPa, $\geq$73 MPa, $\geq$74 MPa, $\geq$75 MPa as measured by ASTM D 638 Type I at 50 mm/min.

The cross-linkable polycarbonates in some embodiments may possess a ductility of $\geq$60%, $\geq$65%, $\geq$70%, $\geq$75%, $\geq$80%, $\geq$85%, $\geq$90%, $\geq$95%, or 100% in a notched izod test at −20° C., −15° C., −10° C., 0° C., 5° C., 10° C., 15° C., 20° C., 23° C., 25° C., 30° C., or 35° C. at a thickness of 3.2 mm according to ASTM D 256-10.

The cross-linkable polycarbonates in some embodiments may have a notched Izod impact strength (NiI) of 2500 Joules per meter (J/m), $\geq$550 J/m, $\geq$600 J/m, $\geq$650 J/m, $\geq$700 J/m, $\geq$750 J/m, $\geq$800 J/m, $\geq$850 J/m, $\geq$900 J/m, $\geq$950 J/m, or $\geq$1000 J/m, measured at 23° C. according to ASTM D 256.

The cross-linkable polycarbonates in some embodiments may have a heat distortion temperature of greater than or equal to: 110° C., 111° C., 112° C., 113° C., 114° C., 115° C., 116° C., 117° C., 118° C., 119° C., 120° C., 121° C., 122° C., 123° C., 124° C., 125° C., 126° C., 127° C., 128° C., 129° C., 130° C., 131° C., 132° C., 133° C., 134° C., 135° C., 136° C., 137° C., 138° C., 139° C., 140° C., 141° C., 142° C., 143° C., 144° C., 145° C., 146° C., 147° C., 148° C., 149° C., 150° C., 151° C., 152° C., 153° C., 154° C., 155° C., 156° C., 157° C., 158° C., 159° C., 160, 161° C., 162° C., 163° C., 164° C., 165° C., 166° C., 167° C., 168° C., 169° C., or 170° C., as measured according to ASTM D 648 at 1.82 MPa, with 3.2 mm thick unannealed mm bar.

The cross-linkable polycarbonates in some embodiments may have a percent haze value of less than or equal to ($\leq$) 10.0%, $\leq$8.0%, $\leq$6.0%, $\leq$5.0%, $\leq$4.0%, $\leq$3.0%, $\leq$2.0%, $\leq$1.5%, $\leq$1.0%, or $\leq$0.5% as measured at a certain thickness according to ASTM D 1003-07. The polycarbonate haze may be measured in some embodiments at a 2.0, 2.2, 2.4, 2.54, 2.6, 2.8, 3.0, 3.2, 3.4, 3.6, 3.8, or a 4.0 millimeter thickness. The polycarbonate in some embodiments may be measured at a 0.125 inch thickness.

The polycarbonate may have a light transmittance greater than or equal to 50%, $\geq$60%, $\geq$65%, $\geq$70%, $\geq$75%, $\geq$80%, $\geq$85%, $\geq$90%, $\geq$95%, $\geq$96%, $\geq$97%, $\geq$98%, $\geq$99%, $\geq$99.1%, $\geq$99.2%, $\geq$99.3%, $\geq$99.4%, $\geq$99.5%, $\geq$99.6%, $\geq$99.7%, $\geq$99.8%, or $\geq$99.9%, as measured at certain thicknesses according to ASTM D 1003-07. The polycarbonate transparency may be measured in some embodiments at a 2.0, 2.2, 2.4, 2.6, 2.8, 3.0, 3.2, 3.4, 3.6, 3.8, or a 4.0 millimeter (mm_thickness.

An interfacial polycondensation polymerization process for bisphenol-A (BPA) based polycarbonates can be used to prepare the cross-linkable polycarbonates of the present disclosure. Although the reaction conditions for interfacial polymerization can vary, an exemplary process generally involves dissolving or dispersing one or more dihydric phenol reactants (e.g. bisphenol-A) in water, adding the resulting mixture to a water-immiscible solvent medium, and contacting the reactants with a carbonate precursor (e.g. phosgene) in the presence of a catalyst (e.g. triethylamine, TEA).

The resulting cross-linkable polycarbonate contains only a small amount of low-molecular-weight components. This can be measured in two different ways: the level of diarylcarbonates (DAC) and the lows percentage can be measured. Diarylcarbonates are formed by the reaction of two end-capping agents with phosgene, creating a small molecule. In embodiments, the resulting photoactive additive contains less than 1000 ppm of diarylcarbonates. The lows percentage is the percentage by weight of oligomeric chains having a molecular weight of less than 1000. In embodiments, the lows percentage is 2.0 wt % or less, including from about 1.0 wt % to 2.0 wt %. The DAC level and the lows percentage can be measured by high performance liquid chromatography (HPLC) or gel permeation chromatography (GPC). Also of note is that the resulting photoactive additive does not contain any residual pyridine, because pyridine is not used in the manufacture of the photoactive additive.

The photoactive additives described above can be blended with a polymer base that is different from the photoactive additive, i.e. a second polymer, to form the blends of the present disclosure. More specifically, the second polymer does not contain photoactive groups. In some embodiments, the weight ratio of the photoactive additive to the polymer base is from 1:99 to 99:1, including from about 50:50 to about 85:15, or from about 10:90 to about 15:85, or from about 25:75 to about 50:50. The polymer base has, in specific embodiments, a weight-average molecular weight of about 17,000 or greater, or 21,000 or greater, including from about 21,000 to about 40,000.

The cross-linkable polycarbonate resins in some embodiments are suitable for blending with polycarbonate homopolymers, polycarbonate copolymers, and polycarbonate blends. They are also suitable for blending with polyesters, polyarylates, polyestercarbonates, and polyetherimides.

The blends may comprise one or more distinct cross-linkable polycarbonates, as described herein, and/or one or more cross-linked polycarbonates, as described herein, as the photoactive additive. The blends also comprise one or more additional polymers. The blends may comprise additional components, such as one or more additives. In certain embodiments, a blend comprises a cross-linkable and/or cross-linked polycarbonate (Polymer A) and a second polymer (Polymer B), and optionally one or more additives. In another embodiment, a blend comprises a combination of a cross-linkable and/or cross-linked polycarbonate (Polymer A); and a second polycarbonate (Polymer B), wherein the second polycarbonate is different from the first polycarbonate.

The second polymer (Polymer B) may be any polymer different from the first polymer that is suitable for use in a blend composition. In certain embodiments, the second polymer may be a polyester, a polyestercarbonate, a bisphenol-A homopolycarbonate, a polycarbonate copolymer, a tetrabromo-bisphenol A polycarbonate copolymer, a polysiloxane-co-bisphenol-A polycarbonate, a polyesteramide, a polyimide, a polyetherimide, a polyamideimide, a polyether, a polyethersulfone, a polyepoxide, a polylactide, a polylactic acid (PLA), or any combination thereof.

In certain embodiments, the second polymer may be a vinyl polymer, a rubber-modified graft copolymer, an acrylic polymer, polyacrylonitrile, a polystyrene, a polyolefin, a polyester, a polyesteramide, a polysiloxane, a polyurethane, a polyamide, a polyamideimide, a polysulfone, a polyepoxide, a polyether, a polyimide, a polyetherimide, a polyphenylene ether, a polyphenylene sulfide, a polyether ketone, a polyether ether ketone, an acrylonitrile-butadiene-styrene (ABS), an acrylic-styrene-acrylonitrile (ASA), a polyethersulfone, a polyphenylsulfone, a poly(alkenylaromatic) polymer, a polybutadiene, a polyacetal, a polycarbonate, a polyphenylene ether, an ethylene-vinyl acetate copolymer, a polyvinyl acetate, a liquid crystal polymer, an ethylene-tetrafluoroethylene copolymer, an aromatic polyester, a polyvinyl fluoride, a polyvinylidene fluoride, a polyvinylidene chloride, tetrafluoroethylene, a polylactide, a polylactic acid (PLA), a polycarbonate-polyorganosiloxane block copolymer, or a copolymer comprising: (i) an aromatic ester, (ii) an estercarbonate, and (iii) carbonate repeat units. The blend composition may comprise additional polymers (e.g. a third, fourth, fifth, sixth, etc., polymer).

In certain embodiments, the second polymer may be a homopolycarbonate, a copolycarbonate, a polycarbonate-polysiloxane copolymer, a polyester-polycarbonate, or any combination thereof. In certain embodiments, the second polycarbonate is a p-cumyl phenol capped poly(isophthalate-terephthalate-resorcinol ester)-co-(bisphenol-A carbonate) copolymer. In certain embodiments, the second polycarbonate is a polycarbonate-polysiloxane copolymer.

The p-cumyl phenol capped poly(isophthalate-terephthalate-resorcinol ester)-co-(bisphenol-A carbonate) polymer or a polycarbonate-polysiloxane copolymer may have a polysiloxane content from 0.4 wt % to 25 wt %. In one preferred embodiment, the second polymer is a p-cumyl-phenol capped poly(19 mol % isophthalate-terephthalate-resorcinol ester)-co-(75 mol % bisphenol-A carbonate)-co-(6 mol % resorcinol carbonate) copolymer (MW=29,000 Daltons). In another preferred embodiment, the second polymer is a p-cumylphenol capped poly(10 wt % isophthalate-terephthalate-resorcinol ester)-co-(87 wt % bisphenol-A carbonate)-co-(3 mol % resorcinol carbonate) copolymer (MW=29,000 Daltons).

In another preferred embodiment, the second polymer is a polycarbonate polysiloxane copolymer. The polycarbonate-polysiloxane copolymer may be a siloxane block co-polycarbonate comprising from about 6 wt % siloxane (±10%) to about 20 wt % siloxane (±10%), and having a siloxane chain length of 10 to 200. In another preferred embodiment, the second polymer is a PC-siloxane copolymer with 20% siloxane segments by weight. In another preferred embodiment, the second polymer is a p-cumyl-phenol capped poly(65 mol % BPA carbonate)-co-(35 mol % 3,3-bis(4-hydroxyphenyl)-2-phenylisoindolin-1-one (PP-PBP) carbonate) copolymer (MW=25,000 Daltons).

In another preferred embodiment, the second polymer is a polyphosphonate polymer, a polyphosphonate copolymer, or a poly(polyphosphonate)-co-(BPA carbonate) copolymer.

In yet other embodiments, the polymer in the blend is selected from the group consisting of a polycarbonate-polysiloxane copolymer; a polycarbonate having an aliphatic chain containing at least two carbon atoms as a repeating unit in the polymer backbone; a copolyester polymer; a bisphenol-A homopolycarbonate; a polystyrene polymer; a poly(methyl methacrylate) polymer; a thermoplastic polyester; a polybutylene terephthalate polymer; a methyl methacrylate-butadiene-styrene copolymer; an acrylonitrile-butadiene-styrene copolymer; a dimethyl bisphenol cyclohexane-co-bisphenol-A copolymer; a polyetherimide; a polyethersulfone; and a copolycarbonate of bisphenol-A and 1,1-bis(4-hydroxyphenyl)-3,3,5-trimethylcyclohexane) (BPTMC).

In particular embodiments, the polymer in the blend is a polycarbonate-polysiloxane (PC—Si) copolymer. The polycarbonate units of the copolymer are derived from dihydroxy compounds having the structures of any of the formulas described above, but particularly those of the chain extenders of Formulas (B) and (C) when Z is hydroxyl. Some illustrative examples of suitable dihydroxy compounds include the following: 1,1-bis(4-hydroxyphenyl) methane, 1,1-bis(4-hydroxyphenyl) ethane, 2,2-bis(4-hydroxyphenyl) propane (hereinafter "bisphenol-A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane; resorcinol, substituted resorcinol compounds such as 5-methyl resorcinol, 5-phenyl resorcinol, or 5-cumyl resorcinol; catechol; hydroquinone; and substituted hydroquinones such as 2-methyl hydroquinone, 2-t-butyl hydroquinone, 2-phenyl hydroquinone, 2-cumyl hydroquinone, or 2,3,5,6-tetramethyl hydroquinone. Bisphenol-A is often part of the PC—Si copolymer.

The polymer (polymer B) in the blend can be a polycarbonate having an aliphatic chain containing at least two carbon atoms as a repeating unit in the polymer backbone. This polymer can also be considered a "soft segment polycarbonate" (SSP). Generally speaking, the SSP is a copolymer of an aromatic difunctional compound and an aliphatic difunctional compound. The aromatic difunctional compound may have the structure of, for example, any of Formulas (A)-(H), previously described as chain extenders above. In specific embodiments, the aromatic difunctional compound is a bisphenol of Formula (A). The aliphatic difunctional compound provides a long aliphatic chain in the backbone and may have the structure of Formula (E).

Exemplary aliphatic diols that are useful in SSP resins include adipic acid (n=4), sebacic acid (n=8), and dodecanedioic acid (n=10). The SSP can be formed, for example by the phosgenation of bisphenol-A, sebacic acid, and p-cumyl phenol. The SSP contains carbonate linkages and ester linkages.

In this regard, it is believed that the cross-linking reaction rate of the cross-linkable polycarbonate and its yield are directly related to the hydrogen-to-ketone ratio of the polymeric blend. Thus, the higher the hydrogen-to-ketone ratio of the blend, the higher the rate of chain-extension reaction/crosslinking should be. Due to the presence of the hydrogen-rich SSP with its aliphatic blocks, the hydrogen-to-ketone ratio is relatively high. As a result, the crosslinking density and the resulting flame retardance and chemical resistance should be very good for this blend. In addition, the SSP has very good flow properties. It is believed that the blend should also have good flow, and should also retain its ductile properties even after crosslinking.

The polymer (polymer B) in the blend can be a bisphenol-A homopolycarbonate. Such resins are available, for example as LEXAN from SABIC Innovative Plastics.

The polymer (polymer B) in the blend can be a polystyrene polymer. Such polymers contain only polystyrene monomers. Thus, for example ABS and MBS should not be considered polystyrene polymers.

The polymer (polymer B) in the blend can be a thermoplastic polyester. An exemplary polyester is PCTG, which is a copolymer derived from the reaction of terephthalic acid, ethylene glycol, and cyclohexanedimethanol (CHDM). The PCTG copolymer can contain 40-90 mole % CHDM, with the terephthalic acid and the ethylene glycol making up the remaining 10-60 mole %.

The polymer (polymer B) in the blend can be a dimethyl bisphenol cyclohexane-co-bisphenol-A copolymer, i.e. a DMBPC-BPA copolymer. The DMBPC is usually from 20 mole % to 90 mole % of the copolymer, including 25 mole % to 60 mole %. The BPA is usually from 10 mole % to 80 mole % of the copolymer, including 40 mole % to 75 mole %. These resins have high scratch resistance.

Other conventional additives can also be added to the polymeric composition (e.g. an impact modifier, UV stabilizer, flame retardant, heat stabilizer, plasticizer, lubricant, mold release agent, filler, reinforcing agent, antioxidant agent, antistatic agent, blowing agent, or radiation stabilizer).

In preferred embodiments, the blend compositions disclosed herein comprise a flame-retardant, a flame retardant additive, and/or an impact modifier. The flame-retardant may be potassium perfluorobutane sulfonate (KPFBS or Rimar salt), potassium diphenyl sulfone-3-sulfonate (KSS), or a combination thereof.

Various types of flame retardants can be utilized as additives. This includes flame retardant salts such as alkali metal salts of perfluorinated $C_1$-$C_{16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like. Rimar salt and KSS and NATS, alone or in combination with other flame retardants, are particularly useful in the compositions disclosed herein. In certain embodiments, the flame retardant does not contain bromine or chlorine, i.e. is non-halogenated. Another useful class of flame retardant is the class of cyclic siloxanes having the general formula $[(R)_2SiO]_y$, wherein R is a monovalent hydrocarbon or fluorinated hydrocarbon having from 1 to 18 carbon atoms and y is a number from 3 to 12. A particularly useful cyclic siloxane is octaphenylcyclotetrasiloxane.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate; phosphates such as trimethyl phosphate; and combinations thereof.

Mold release agent (MRA) will allow the material to be removed quickly and effectively, and can reduce cycle times, defects, and browning of finished product. Exemplary MRAs include phthalic acid esters; di- or polyfunctional aromatic phosphates such as resorcinol tetraphenyl diphosphate (RDP), the bis(diphenyl) phosphate of hydroquinone and the bis(diphenyl) phosphate of bisphenol-A; pentaerythritol tetrastearate (PETS), and the like.

In other particular embodiments, the polymeric blend/composition includes the cross-linkable polycarbonate, an optional polymer base, a flame retardant; a heat stabilizer, and a mold release agent.

The cross-linkable polycarbonate can be made into polycarbonate fibers using methods known in the art. For example, a Fiberlab L1000 device (from Fiberio) can be used. Generally speaking, the polymeric composition is dissolved in a solvent to form a solution, which is placed in a liquid reservoir. This liquid reservoir is spun on a vertical axis, pushing the liquid state material to the outer wall where orifices are present. The centrifugal and hydrostatic forces initiate a liquid jet, and external shear forces promote cooling and solvent evaporation, creating the fiber. Alternatively, methods such as force spinning, electrospinning, or melt spinning can also be used.

In more specific embodiments, the polymeric composition (containing the cross-linkable polycarbonate resin) is dissolved in an organic solvent to form a solution for spinning. The organic solvent can be, for example, methylene chloride or dichloromethane. The polymeric composition is desirably at least 10 wt % of the solution, including from 10 wt % to 20 wt % of the solution.

For clarity, the term "fiber" is a strand of material having a length and a diameter, generally having a cylinder-like shape. The length is greater than the diameter. The fibers of the present disclosure may have an average length of from about 2 mm to about 8 meters, including from about 2 mm to about 4 mm. The fibers may have an average diameter of from about 1 micrometer to about 40 micrometers, including from about 1 micrometers to about 20 micrometers, from about 2 micrometers to about 12 micrometers, from about 10 micrometers to about 40 micrometers, or from about 12 micrometers to about 15 micrometers. Alternatively, the fibers may be described as having these recited average diameters and also having an aspect ratio (length to diameter) of from about 3:1 to about 1 million:1.

In the past, fibers have been formed from various polymeric materials. To improve the properties of these fibers, such as chemical resistance, those fibers have included an exterior coating or jacket. In the polycarbonate fibers of the present disclosure, the polymeric composition (containing the cross-linkable polycarbonate resin) forms the exterior surface of the fiber. Put another way, the polycarbonate fibers do not include a coating or jacket formed from a different composition.

The present disclosure particularly contemplates the polycarbonate fibers are used in fibrous substrates, such as paper. After UV exposure, crosslinking of the polycarbonate fibers will improve certain properties of the fibrous substrate, such as the chemical resistance, flame resistance, and durability. In addition, the polycarbonate fibers may have a relatively low viscosity which enables easier processing.

The polycarbonate fibers are generally used to reinforce the other fibers present in the fibrous substrate. For example, the fibrous substrate in particular embodiments comprises cellulose fibers, so that the fibrous substrate can be used to form sheets of paper. Generally, the other fibers comprise from about 20 wt % to about 80 wt % of the fibrous substrate. The polycarbonate fibers also comprise from about 20 wt % to about 80 wt % of the fibrous substrate. In more particular embodiments, the polycarbonate fibers comprise 50 wt % or less, 40 wt % or less, or 30 wt % or less of the fibrous substrate. Put another way, the other fibers can comprise 50 wt % or more, 60 wt % or more, or 70 wt % or more of the fibrous substrate In some embodiments, the polycarbonate fibers are contemplated as being evenly dispersed throughout the fibrous substrate. In other embodiments, the fibrous substrate is made of two layers, one layer containing only the polycarbonate fibers and the other layer containing only the other fibers. The other fibers can be provided in the form of pulp. After mixing the polycarbonate fibers with the other fibers, the fibrous substrate (i.e. paper) can be made using methods known in the art. The fibrous substrate generally has a thickness of between 0.05 millimeters (mm) and 0.3 mm.

The other fibers in the fibrous substrate can be made using methods known in the art. For example, cellulose fibers can be obtained by chemical pulping, mechanical pulping, grinding, cryocrushing, etc.

The other fibers can comprise carbon, glass, aramid, basalt, quartz, boron, cellulose, natural fibers, liquid crystal polymer, or a high tenacity polymer. Other suitable materials for the other fibers include a thermoplastic selected from the group consisting of polycarbonates, polyimides, polyetheretherketone, polyetherketone, polyetherketoneketone, acrylonitrile butadiene styrene, polyoxymethylene, poly(p-phenylene ether), polypropylenes, polyethylenes, polystyrenes, polyvinyls, polyethylene terephthalates, polybutylene terephthalates, acrylics, nylons, thermoplastic polyurethanes, polyacetals, polyphenylene sulfides, cycloolefin copolymers, and thermotropic polyesters.

The fibrous substrate can be formed as a paper sheet. At least two such manners of preparing the fibrous substrate are contemplated. First, the polycarbonate fibers can be melted, then cooled to form the fibrous substrate. The other fibers may or may not be melted as well. Here, the other fibers can be considered to act as reinforcing fibers. The polycarbonate fibers are then crosslinked. Alternatively, the polycarbonate fibers and the other fibers are blended together, then extruded, then crosslinked.

The fibrous substrate can be honeycomb paper, which takes the form of a honeycomb structure, with the paper having a thickness of one-sixteenth inch to one-half inch, and the length of each hexagon being roughly one-eighth inch. This structure can be used as a lightweight composite structure, for example in airplanes. The fibrous substrate could also be electrical paper, which is used in electrical devices as a wrap that becomes an insulator, for example in a motor or a transformer. The fibrous substrate could also be filter paper, which is used to make filters.

The polycarbonate fibers, once formed, are subsequently exposed to ultraviolet (UV) light at an appropriate wavelength and in an appropriate dosage to affect cross-linking. The exposure can be accomplished using standard methods known in the art. For example, the UV light can come from any source of UV light such as, but not limited to, those lamps powered by microwave, HID lamps, and mercury vapor lamps. In some other embodiments, the product is exposed by using natural sunlight. The exposure time can range from a few minutes to several days. Alternatively, the crosslinking can be accomplished by using a UV-emitting light source such as a mercury vapor, High-Intensity Discharge (HID), or various UV lamps. For example, commercial UV lamps are sold for UV curing from manufacturers such as Hereaus Noblelight Fusion UV. Non-limiting examples of UV-emitting light bulbs include mercury bulbs (H bulbs), or metal halide doped mercury bulbs (D bulbs, H+ bulbs, and V bulbs). Other combinations of metal halides to create a UV light source are also contemplated. Exemplary bulbs could also be produced by assembling the lamp out of UV-absorbing materials and considered as a filtered UV source. An undoped mercury arc lamp is not used for irradiation. An H bulb has strong output in the range of 200 nm to 320 nm. The D bulb has strong output in the 320 nm to 400 nm range. The V bulb has strong output in the 400 nm to 420 nm range.

It can be beneficial to control the temperature. Often increased temperature can increase the crosslinking, but if the temperature is excessive the product can become unacceptably discolored, warped, or distorted.

It may also be advantageous to use a UV light source where the harmful wavelengths (those that cause polymer degradation or excessive yellowing) are removed or not present. Equipment suppliers such as Heraeus Noblelight and Fusion UV provide lamps with various spectral distributions. The light can also be filtered to remove harmful or unwanted wavelengths of light. This can be done with optical filters that are used to selectively transmit or reject a wavelength or range of wavelengths. These filters are commercially available from a variety of companies such as Edmund Optics or Praezisions Glas & Optik GmbH. Bandpass filters are designed to transmit a portion of the spectrum, while rejecting all other wavelengths. Longpass edge filters are designed to transmit wavelengths greater than the cut-on wavelength of the filter. Shortpass edge filters are used to transmit wavelengths shorter than the cut-off wavelength of the filter. Various types of materials, such as borosilicate glass, can be used as a long pass filter. Schott and/or Praezisions Glas & Optik GmbH for example have the following long pass filters: WG225, WG280, WG295, WG305, WG320 which have cut-on wavelengths of about 225, 280, 295, 305, and 320 nm, respectively. These filters can be used to screen out the harmful short wavelengths while transmitting the appropriate wavelengths for the crosslinking reaction.

In particular embodiments, the polycarbonate fibers are exposed to a selected UV light range having wavelengths from about 280 nanometers (nm) to about 380 nm, or from about 330 nm to about 380 nm, or from about 280 nm to about 360 nm, or from about 330 nm to about 360 nm. The wavelengths in a "selected" light range have an internal transmittance of greater than 50%, with wavelengths outside of the range having an internal transmittance of less than 50%. The change in transmittance may occur over a range of 20 nm. Reference to a selected light range should not be construed as saying that all wavelengths within the range transmit at 100%, or that all wavelengths outside the range transmit at 0%.

In some embodiments, the UV radiation is filtered to provide exposure to UVA radiation with no detectable UVC radiation, as measured using an EIT PowerPuck. The effective dosage can range from at least 2 joules per square centimeter ($J/cm^2$) of UVA radiation up to about 60 $J/cm^2$ of UVA radiation. In more specific embodiments, the UV radiation is filtered to provide an effective dosage of at least 3 J/cm², or at least 12 J/cm², or at least 21 J/cm², or at least 36 J/cm² of UVA radiation, with no detectable UVC radiation, as measured using an EIT PowerPuck. In particular embodiments, the polycarbonate fibers are exposed to a dosage of about 21 J/cm² to about 60 J/cm² of UVA radiation, or in more particular embodiments a dosage of about 21 J/cm² to about 36 J/cm² of UVA radiation.

It is contemplated that the polycarbonate fibers are directly exposed to the UV radiation, such that the exterior surfaces of the fibers are cross-linked. This exposure will improve the chemical resistance and dimensional stability of the fibers.

The following examples are provided to illustrate the polymeric compositions/blends, articles, processes and properties of the present disclosure. The examples are merely illustrative and are not intended to limit the disclosure to the materials, conditions, or process parameters set forth therein.

EXAMPLES

Example 1

Fibers were made from an XPC-D polymer which was a bisphenol-A polymer with 4-hydroxybenzophenone endcaps present in an amount of 2.5 mole %, with no p-cumylphenol endcap, and having an Mw of 22,000. The XPC-D was blended with 0.06 phr phosphite stabilizer. This polymeric composition had an MVR (300° C./1.2 kg, 360 sec dwell) of 8.5 cc/10 min.

A Fiberlab L1000 device (from FibeRio Technology Corporation, McAllen, Tex.) was used to form fibers. 10 wt % of the composition was dissolved in methylene chloride to form a solution, which was placed in a liquid reservoir. This liquid reservoir was spun on a vertical axis, pushing the liquid state material to the outer wall where orifices were present. The centrifugal and hydrostatic forces initiate a liquid jet, and external shear forces promote cooling and solvent evaporation, creating the fiber.

Figure 4:
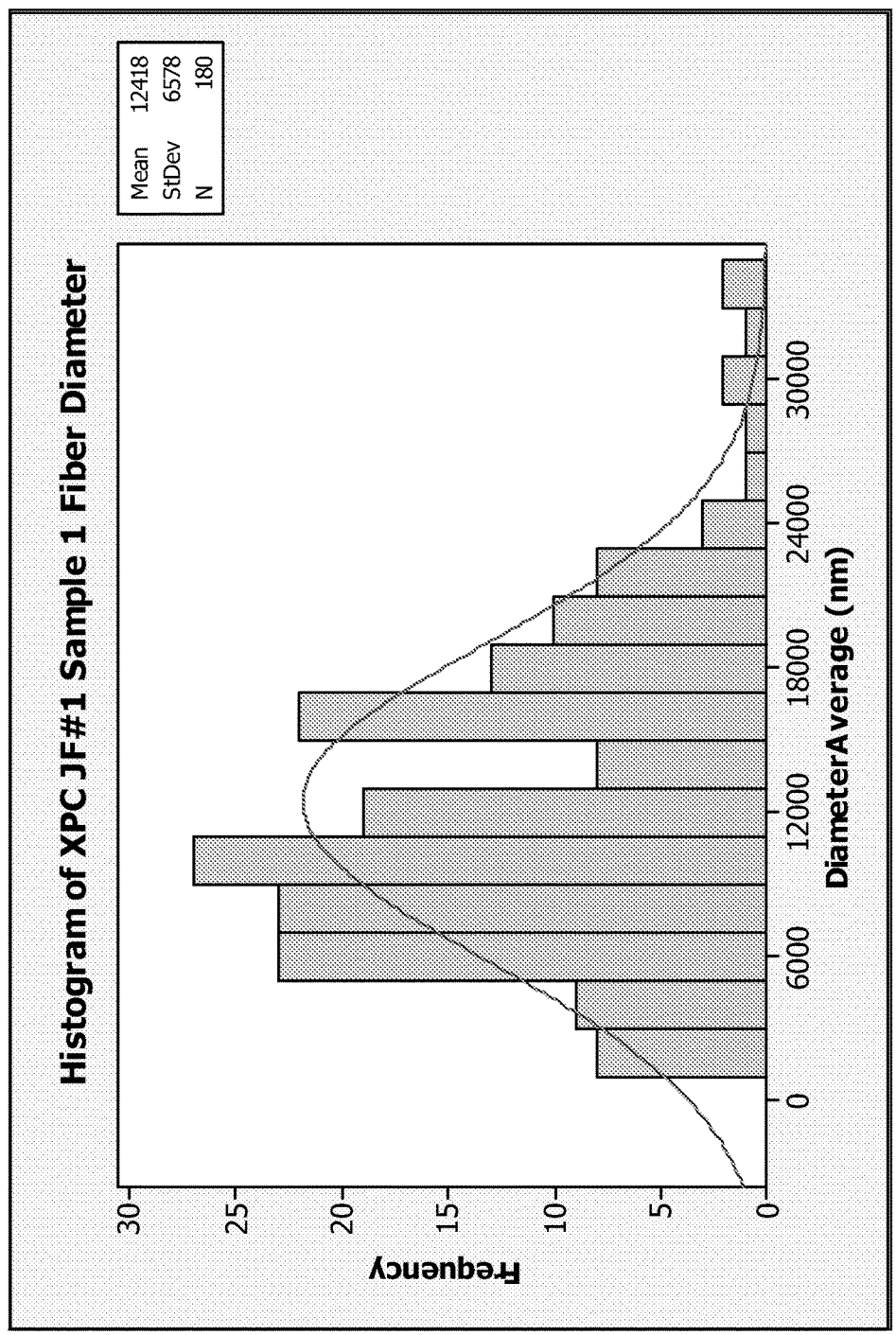
FIG. 4 is a graph showing the fiber diameter distribution produced when using an orifice diameter of 159 micrometers.

Two sets of fibers were made. The first set (Sample 1) was made at 12,000 rpm and an orifice diameter of 159 micrometers. The resulting fibers had an average fiber diameter of 12.4 micrometers, a standard deviation of 6.6 micrometers, and a median diameter of 11 micrometers. FIG. 4 is a histogram showing the distribution of the fibers produced. N is the number of measurements made, and the y-axis indicates the number of measurements falling within a specified diameter range.

Figure 5:
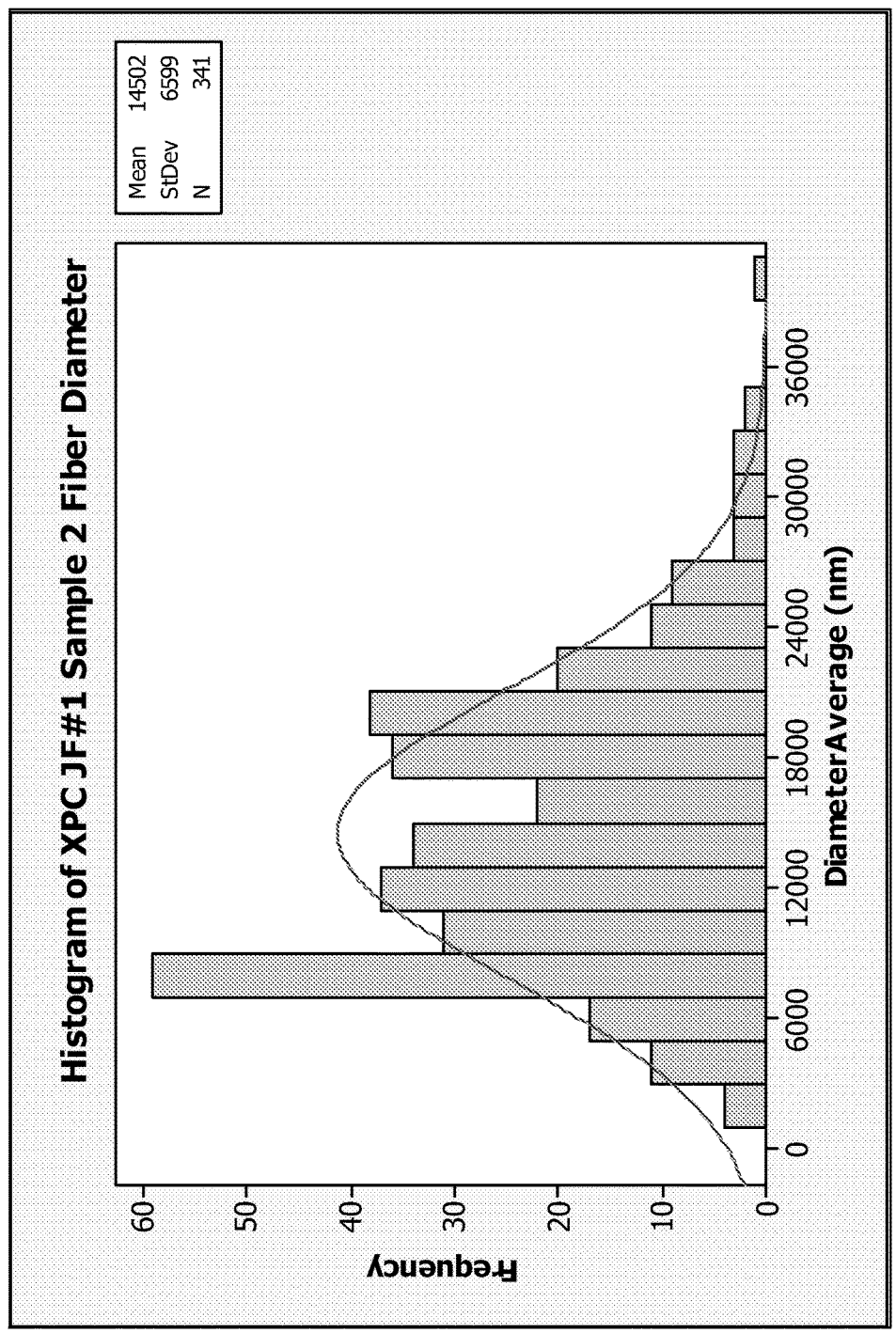
FIG. 5 is a graph showing the fiber diameter distribution produced when using an orifice diameter of 210 micrometers.

The second set (Sample 2) was made at 12,000 rpm and an orifice diameter of 210 micrometers. The resulting fibers had an average fiber diameter of 14.5 micrometers, a standard deviation of 6.6 micrometers, and a median diameter of 13.7 micrometers. FIG. 5 is a histogram showing the distribution of the fibers produced. N is the number of measurements made, and the y-axis indicates the number of fibers falling within a specified diameter range.

Some fibers from Sample 1 were then exposed to UV light in a Loctite Zeta 7411-S system, which used a 400 W D-bulb metal halide arc lamp and behaved like a filter with a 280-nm cut-on wavelength. The Loctite system provided approximately 36 J/cm² of UVA, 7.2 J/cm² of UVB, 0 J/cm² of UVC, and 21.9 J/cm² of UVV, as measured using an EIT PowerPuck.

Exposed and un-exposed fibers were then placed in methylene chloride. Un-exposed fibers dissolved, while undissolved material remained for the exposed fibers, indicating a gel had been formed and crosslinking had occurred. The fibers were removed from the methylene chloride and examined by optical microscopy. The fibers examined had a diameter of 2 micrometers to 12 micrometers, suggesting that the cross-linked fibers remained dimensionally stable after cross-linking.

Example 2

50 wt % of the fibers of Example 1 are combined with 50 wt % of cellulose fibers and exposed to a high temperature to cause melting of the polycarbonate fibers and form a paper sheet. The paper sheet is exposed to UV radiation to cause crosslinking of the polycarbonate fibers.

Example 3

50 wt % of the fibers of Example 1 are blended with 50 wt % of polyimide fibers. The blended mixture of fibers is then extruded to form a paper sheet. The paper sheet is exposed to UV radiation to cause crosslinking of the polycarbonate fibers.

Example 4

Fibers were made from a blend of a low-flow bisphenol-A homopolymer (LF-BPA) and a XPC-DHBP The LF-BPA had an Mw of about 30,000 and an MFI of 6.4 g/10 min. The XPC-DHBP was a crosslinkable copolycarbonate of bisphenol-A and 10 mole % 4,4'-dihydroxybenzophenone (4,4'-DHBP), which had a Mw of about 21,000.

75 parts LF-BPA was blended with 25 parts XPC-DHBP, 0.08 parts KPFBS, and 0.06 parts phosphite stabilizer. An FET extruder (commercially available from Fiber Extrusion Technologies) was used to form the fibers. The extruder used a 3.5 cubic centimeter (cc) pump, had 72 holes that were 0.6 mm in diameter, and 3.6 mm land, with an L/D ratio of 6.

Two different types of fibers were made. The fibers were either 3.2 denier per filament (dpf) or 6.0 dpf. The two types of fibers were tested at various shrinkage temperatures to determine their tenacity (grams-force/denier (gf/den)), both before and after UV exposure. "No UV" refers to the fiber before UV exposure. "UV" refers to the fiber after UV exposure. "DNS" means the fiber did not survive testing.

TABLE 1

| Sample | Shrinkage Temp (° C.) | Average shrinkage (%) | Shrinkage StDev (%) | Average Fiber Tenacity (gf/den) | Tenacity StDev (gf/den) |
| --- | --- | --- | --- | --- | --- |
| 3.2 dpf No UV | 135 | 2.2 | 0.3 | 1.5 | 0.1 |
| 3.2 dpf UV | 135 | 2.3 | 0.6 | 1.6 | 0.0 |
| 6.0 dpf No UV | 135 | 1.7 | 0.3 | 1.3 | 0.2 |
| 6.0 dpf UV | 135 | 2.1 | 0.4 | 1.5 | 0.1 |
| 3.2 dpf No UV | 160 | 68.7 | 2.0 | 1.3 | 0.4 |
| 3.2 dpf UV | 160 | 51.3 | 7.4 | 1.5 | 0.2 |
| 6.0 dpf No UV | 160 | 67.2 | 1.6 | 1.5 | 0.2 |
| 6.0 dpf UV | 160 | 57.3 | 1.0 | 1.3 | 0.2 |
| 3.2 dpf No UV | 185 | — | — | — | — |
| 3.2 dpf UV | 185 | 70.6 | 1.4 | 1.2 | 0.1 |
| 6.0 dpf No UV | 185 | — | — | — | — |
| 6.0 dpf UV | 185 | 71.0 | 0.7 | 0.9 | 0.1 |
| 3.2 dpf No UV | 210 | — | — | — | — |
| 3.2 dpf UV | 210 | DNS | — | — | — |
| 6.0 dpf No UV | 210 | — | — | — | — |
| 6.0 dpf UV | 210 | DNS | — | — | — |

TABLE 1-continued

| Sample | Shrinkage Temp (° C.) | Average shrinkage (%) | Shrinkage StDev (%) | Average Fiber Tenacity (gf/den) | Tenacity StDev (gf/den) |
|---|---|---|---|---|---|
| 3.2 dpf UV | None | — | — | 1.9 | 0.1 |
| 6.0 dpf UV | None | — | — | 1.5 | 0.1 |

Considering shrinkage first, the exposed and unexposed fibers both had similar shrinkage at 135° C. At 160° C., the unexposed fibers shrank about 10% more. The exposed fibers survived at 185° C.

Considering tenacity, the fibers generally became more brittle as the shrinkage temperature increased. There was no significant difference in tenacity between the exposed and unexposed fibers. The tenacity deteriorated with increased temperature.

The dimensional stability of the substrate was improved after UV exposure, as measured by an absolute improvement in the % loss of fiber length of 9.5% or more compared to before the UV exposure at 160° C. For the 3.2 dpf blend sample, the % loss before exposure was 68.7%, so an absolute improvement of 9.5% would require the sample after exposure to have a % loss of fiber of at most 59.2% (i.e. 68.7-9.5). However, the sample after exposure had 51.3% loss, which was much better. Similarly, the 6.0 dpf sample after exposure at 57.3% loss was better than the permitted 57.7% (i.e. 67.2-9.5).

Example 5

Pure XPC-DHBP fibers were made at 3.1 dpf, 3.6 dpf, and 6.2 dpf. These pure fibers were made from a composition containing 100 parts XPC-DHBP from Example 4, 0.08 parts KPFBS, 0.1 parts cyclic siloxane, and 0.06 parts phosphite stabilizer. These fibers were also formed using the FET extruder of Example 4. The shrinkage of these pure fibers at 3.6 dpf was measured, before and after UV exposure. A shrinkage temperature of 160° C. was used. All of the fibers had an initial length of 30.48 cm, and the final length is reported in Table 2 below. These pure fibers were compared to the blended fibers of 3.2 dpf from Example 4. "No UV" refers to the fiber before UV exposure. "UV" refers to the fiber after UV exposure.

TABLE 2

| Sample | Blend? | Final length (cm) | StDev (cm) | % loss |
|---|---|---|---|---|
| 3.2 dpf No UV | Y | 21.54 | 1.02 | 29.33 |
| 3.2 dpf UV | Y | 25.34 | 0.32 | 16.86 |
| 3.6 dpf No UV | N | 18.02 | 0.37 | 40.88 |
| 3.6 dpf UV | N | 25.34 | 0.88 | 16.87 |

Whether the XPC-DHBP fibers were blended with other materials or were neat, they still shrank about the same amount after UV exposure. They also shrank less after UV exposure compared to before UV exposure. It is noted that for both of these samples (blended or neat), the dimensional stability of the substrate was improved after UV exposure, as measured by an absolute improvement in the % loss of fiber length of 9.5% or more compared to before the UV exposure. For the 3.2 dpf blend sample, the % loss before exposure was 29.33%, so an absolute improvement of 9.5% or more would require the sample after exposure to have a % loss of fiber of at most 19.83% (i.e. 29.33-9.5). However, the sample after exposure had 16.86%, which was much better. Similarly, the 3.6 dpf sample after exposure at 16.87% was much better than the permitted 33.38% (40.88-9.5).

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A cross-linkable polycarbonate fiber, formed from a polymeric composition comprising a cross-linkable polycarbonate resin containing a photoactive group derived from a monohydroxybenzophenone, wherein the cross-linkable polycarbonate resin does not contain any residual pyridine, and the cross-linkable polycarbonate resin does not contain any repeating units derived from dihydroxybenzophenones.

2. The fiber of claim 1, having a diameter of about 1 micron to 40 microns and an aspect ratio of about 3:1 to about 1 million:1.

3. The fiber of claim 1, wherein the cross-linkable polycarbonate resin is formed from a reaction of: monohydroxybenzophenone; a diol chain extender; and a first linker moiety comprising a plurality of linking groups, wherein each linking group can react with the hydroxyl groups of the monohydroxybenzophenone and the diol chain extender.

4. The fiber of claim 1, wherein the cross-linkable polycarbonate resin contains from about 0.5 mole % to about 5 mole % of endcap groups derived from the monohydroxybenzophenone and has a polydispersity index (PDI) of between 3.0 and 7.3 as measured by GPC using a UV-VIS detector and polycarbonate standards.

5. The fiber of claim 1, wherein the polymeric composition forms the exterior surface of the fiber.

6. The fiber of claim 1, wherein the fiber does not include a coating or jacket.

7. An article comprising the fiber of claim 1.

8. A fibrous substrate comprising polycarbonate fibers of claim 1.

9. The fibrous substrate of claim 8, wherein the polycarbonate fibers comprise from about 20 wt % to about 80 wt % of the fibrous substrate.

10. The fibrous substrate of claim 8, wherein the fibrous substrate further comprises first fibers.

11. The fibrous substrate of claim 10, wherein the first fibers and the polycarbonate fibers are evenly dispersed throughout the fibrous substrate.

12. The fibrous substrate of claim 10, wherein the first fibers are made from a material selected from the group consisting of carbon, glass, aramid, basalt, quartz, boron, cellulose, natural fibers, liquid crystal polymer, and high tenacity polymer; or are made from a thermoplastic selected from the group consisting of polycarbonates, polyimides, polyetheretherketone, polyetherketone, polyetherketoneketone, acrylonitrile butadiene styrene, polyoxymethylene, poly(p-phenylene ether), polypropylenes, polyethylenes, polystryrenes, polyvinyls, polyethyleneterephthalates, polybutylene terephthalates, acrylics, nylons, thermoplastic polyurethanes, polyacetals, polyphenylene sulfides, cycloolefin copolymers and thermotropic polyesters.

13. The fibrous substrate of claim 8, wherein the dimensional stability of the substrate is improved after UV exposure, as measured by an absolute improvement in the average % loss of fiber length of 9.5% or more compared to before the UV exposure at 160° C.

14. A process for producing a strengthened fibrous substrate comprising: exposing the fibrous substrate of claim 8 to a dosage of UV radiation.

15. The fibrous substrate of claim 1, wherein the cross-linkable polycarbonate further comprises about 0.5 mol % to about 5 mol % of endcap groups derived from a second end-capping agent selected from the group consisting of phenol, p-t-butylphenol, p-cumylphenol, and 4-cyanophenol.

16. A cross-linkable polycarbonate fiber, formed from a polymeric composition comprising a cross-linkable polycarbonate resin containing a photoactive group derived from a dihydroxybenzophenone and endcap groups derived from an end-capping agent selected from the group consisting of phenol, p-t-butylphenol, p-cumylphenol, octylphenol, and p-cyanophenol, wherein the cross-linkable polycarbonate resin does not contain any residual pyridine, and the polymeric composition further comprises a polymeric base resin, wherein the weight ratio of the cross-linkable polycarbonate resin to the polymeric base resin is from about 50:50 to about 95:5, wherein a fibrous substrate comprising the cross-linkable polycarbonate fiber has improved dimensional stability after UV exposure, as measured by an absolute improvement in the average % loss of fiber strength of 95% or more compared to before the UV exposure at 160° C.

17. The fiber of claim 16, wherein the cross-linkable polycarbonate resin is formed from a reaction of: the dihydroxybenzophenone; a diol chain extender; a first linker moiety comprising a plurality of linking groups, wherein each linking group can react with the hydroxyl groups of the dihydroxybenzophenone and the diol chain extender; and the endcapping agent.

18. The fiber of claim 17, wherein the dihydroxybenzophenone is 4,4' dihydroxybenzophenone; the diol chain extender is bisphenol-A; and the first linker moiety is phosgene.

19. The fiber of claim 1, wherein the polymeric composition further comprises a polymeric base resin.

20. The fiber of claim 19, wherein the weight ratio of the cross-linkable polycarbonate resin to the polymeric base resin is from about 50:50 to about 95:5.

\* \* \* \* \*